US009240007B2

(12) United States Patent
Barragán Treviño et al.

(10) Patent No.: US 9,240,007 B2
(45) Date of Patent: Jan. 19, 2016

(54) VENDING SYSTEM

(71) Applicant: Vendwatch Telematics, LLC, Austin, TX (US)

(72) Inventors: Alfonso Javier Barragán Treviño, Monterrey (MX); Alfonso Javier Barragán Rodríguez, Monterrey (MX); James J. Crow, Austin, TX (US)

(73) Assignee: Vendwatch Telematics, LLC, Austin, TX (US)

( * ) Notice: Subject to any disclaimer, the term of this patent is extended or adjusted under 35 U.S.C. 154(b) by 0 days.

(21) Appl. No.: 14/504,814

(22) Filed: Oct. 2, 2014

(65) Prior Publication Data
US 2015/0100152 A1 Apr. 9, 2015

Related U.S. Application Data

(60) Provisional application No. 61/886,231, filed on Oct. 3, 2013, provisional application No. 61/929,666, filed on Jan. 21, 2014.

(51) Int. Cl.
*G06Q 20/32* (2012.01)
*G07F 11/00* (2006.01)
*G07F 9/02* (2006.01)
*G07F 9/10* (2006.01)

(52) U.S. Cl.
CPC .............. *G06Q 20/322* (2013.01); *G07F 9/023* (2013.01); *G07F 9/10* (2013.01); *G07F 11/002* (2013.01)

(58) Field of Classification Search
CPC ......... G07F 11/002; G07F 9/10; G07F 9/023; G06Q 20/322
See application file for complete search history.

(56) References Cited

U.S. PATENT DOCUMENTS 6,844,813 B2   1/2005   Hardman
6,959,230 B1  10/2005   Leibu (Continued)

FOREIGN PATENT DOCUMENTS

JP   2001307187   11/2001
JP   2002133226    5/2002

(Continued)

OTHER PUBLICATIONS

International Searching Authority, "Notification of Transmittal of the International Search Report and the Written Opinion of the International Searching Authority," mailed Jan. 20, 2015, in International application No. PCT/US2014/058790.

*Primary Examiner* — Timothy Waggoner
(74) *Attorney, Agent, or Firm* — Trop, Pruner & Hu, P.C.

(57) ABSTRACT

An embodiment includes a system comprising a first vending machine (VM), the first VM comprising: an exterior chassis having a top, bottom, backside, front side, and first and second sides that couple the front side to the backside; a wireless short range communications node included in the chassis; and an actuator coupled to a compartment included in the chassis; wherein (a) the actuator provides a vended good to an aperture in the front side upon actuation, and (b) each of the front side and first and second sides includes no physically manipulatable consumer interface with which the consumer can control the first VM via direct physical manipulation of the first VM. Other embodiments are described herein.

16 Claims, 23 Drawing Sheets

(56) References Cited

U.S. PATENT DOCUMENTS

| | | | |
|---|---|---|---|
| 7,194,430 B2 | 3/2007 | Vonholm | |
| 7,366,586 B2 * | 4/2008 | Kaplan et al. | 700/241 |
| 7,428,507 B2 | 9/2008 | Villaret | |
| 7,458,510 B1 | 12/2008 | Zhou | |
| 7,533,065 B2 | 5/2009 | Piikivi | |
| 7,574,377 B2 * | 8/2009 | Carapelli | 705/26.43 |
| 7,627,496 B2 * | 12/2009 | Walker et al. | 705/16 |
| 7,784,684 B2 | 8/2010 | Labrou | |
| 7,970,669 B1 | 6/2011 | Santos | |
| 8,131,595 B2 | 3/2012 | Lee | |
| 8,352,360 B2 | 1/2013 | De | |
| 8,538,334 B2 | 9/2013 | Inagaki | |
| 8,739,293 B2 * | 5/2014 | Walker et al. | 726/26 |
| 8,774,963 B2 * | 7/2014 | Signorelli et al. | 700/232 |
| 8,781,622 B2 * | 7/2014 | Mockus et al. | 700/237 |
| 2002/0046185 A1 | 4/2002 | Villart | |
| 2004/0078332 A1 | 4/2004 | Ferguson | |
| 2008/0173707 A1 | 7/2008 | Walker | |
| 2008/0275779 A1 | 11/2008 | Lakshminarayanan | |
| 2010/0191369 A1 | 7/2010 | Kim | |
| 2011/0112898 A1 | 5/2011 | White | |
| 2011/0225057 A1 | 9/2011 | Webb | |
| 2011/0251910 A1 | 10/2011 | Dimmick | |
| 2012/0310776 A1 | 12/2012 | Stache | |

FOREIGN PATENT DOCUMENTS

| | | |
|---|---|---|
| KR | 20020090763 | 12/2002 |
| KR | 20030018453 | 3/2003 |
| KR | 1020050105904 | 11/2005 |
| KR | 1020060036018 | 4/2006 |

* cited by examiner

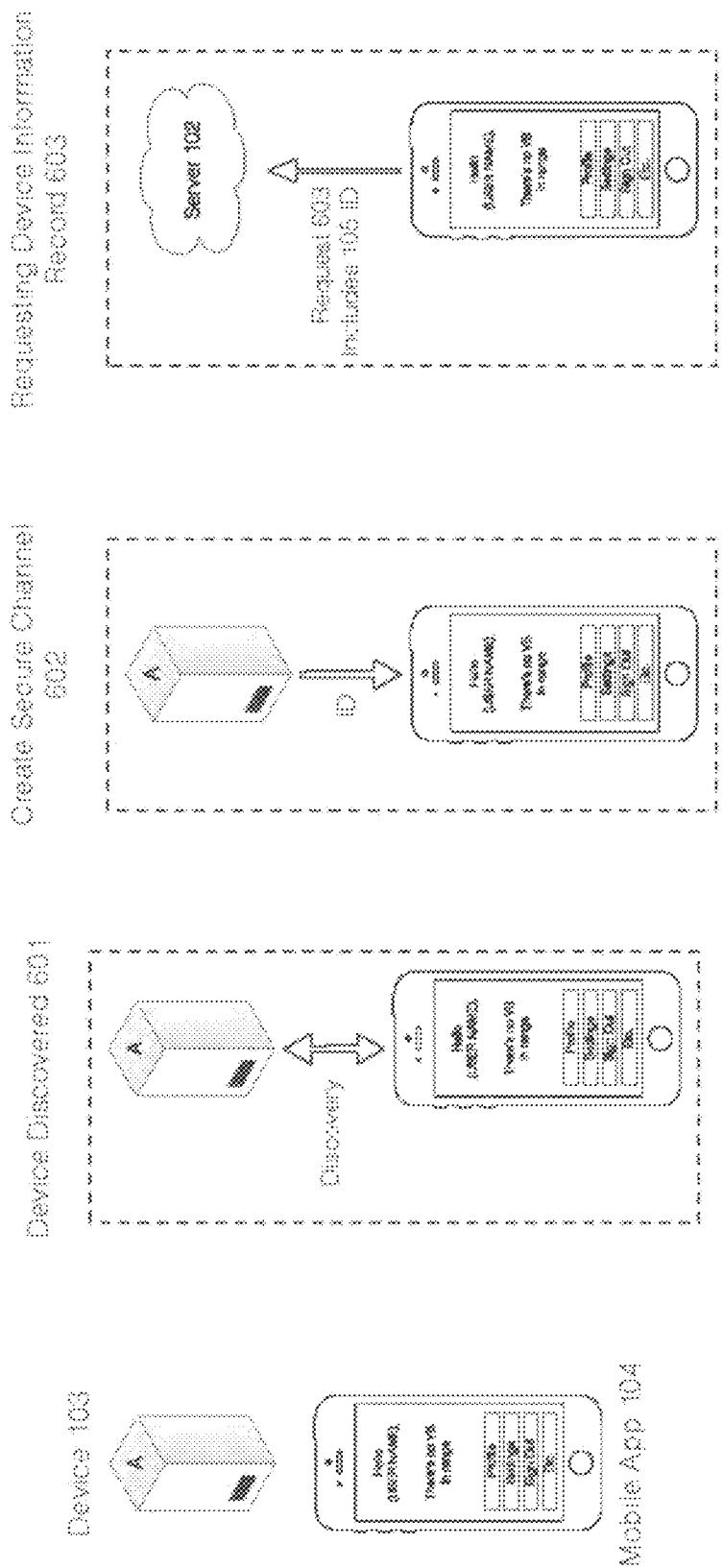

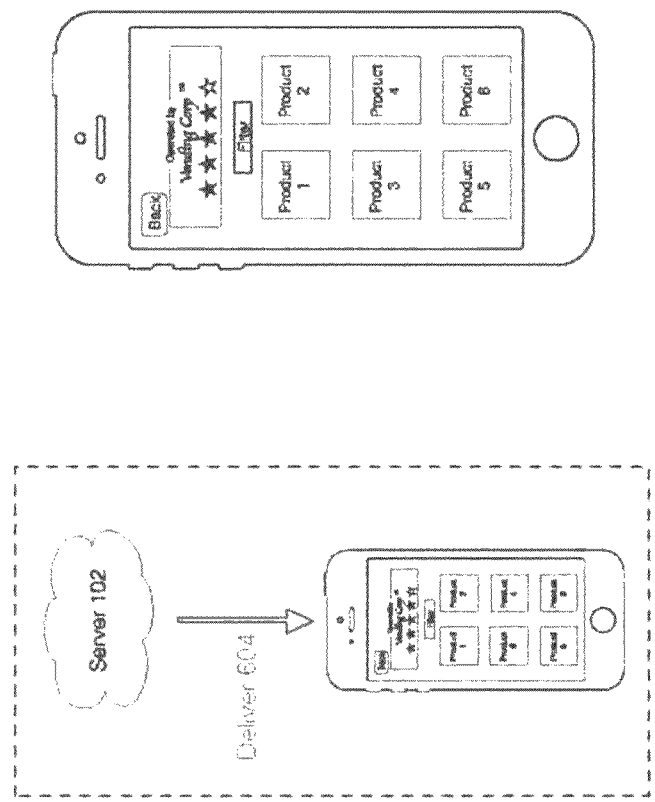

VENDING SYSTEM

CROSS-REFERENCE TO RELATED APPLICATIONS

This application claims priority to U.S. Provisional Patent Application No. 61/886,231 filed on Oct. 3, 2013 and entitled "System for Centrally Controlled, Locally Managed Remote Point of Sale Terminals Via Smartphone Applications", the content of which is hereby incorporated by reference.

This application claims priority to U.S. Provisional Patent Application No. 61/929,666 filed on Jan. 21, 2014 and entitled "System for Centrally Controlled, Locally Managed Remote Point of Sale Terminals Via Smartphone Applications", the content of which is hereby incorporated by reference.

TECHNICAL FIELD

An embodiment addresses vending systems and more specifically and in some embodiments, user/vending system interfaces and vending operator/vending system interfaces.

BACKGROUND

Historically, vending machines (VM) and other remote point of sale (PoS) terminals were required to be intelligent and self-sufficient devices that could operate autonomously. This was a simple task back in the era of electro-mechanical based vending operations combined with simple coin acceptance. However, there have been several new trends in this industry that have served to make these systems much more complicated. Examples of these are the inclusion of wireless networking devices such as general packet radio service (GPRS) or Wi-Fi modems, industry standard inventory and exception reporting such as data exchange (DEX), multiple-product/multiple-package/multiple-price options that require configuration of the machine. Probably the most complicating factor has been the emergence of the cashless vending model. This single aspect has caused the complexity and security of a VM to basically match that of a remote teller machine such as an ATM in order to protect consumer credit card information.

This increasing complexity does provide useful advanced functionality for the machine but at the cost of significantly increasing the capital equipment and recurring management costs for VMs while at the same time reducing the mean time between failures. In addition, the VM manufacturers must develop new machine types to keep up with the feature demands. This causes obsolescence of existing machines and requires significant new capital expenditure by the operators to bring new features into an existing market.

BRIEF DESCRIPTION OF THE DRAWINGS

Features and advantages of embodiments of the present invention will become apparent from the appended claims, the following detailed description of one or more example embodiments, and the corresponding figures. Where considered appropriate, reference labels have been repeated among the figures to indicate corresponding or analogous elements.

FIG. 13$k$-$m$ depict a series of GUIs that provide a user experience in an embodiment.

DETAILED DESCRIPTION

Figure 1:
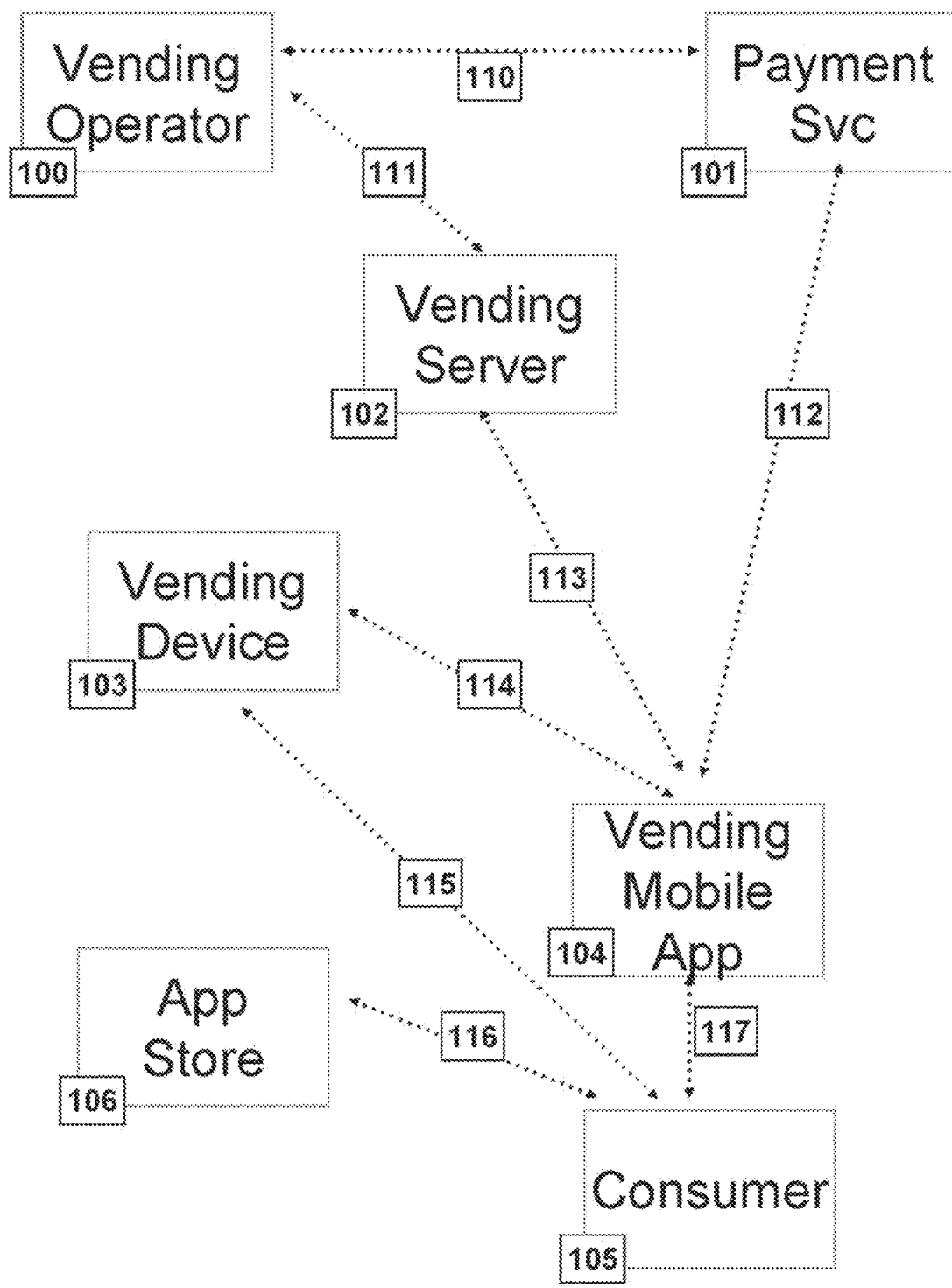
FIG. 1 includes a network architecture in an embodiment of the invention.

In the following description, numerous specific details are set forth but embodiments of the invention may be practiced without these specific details. Well-known circuits, structures and techniques have not been shown in detail to avoid obscuring an understanding of this description. "An embodiment", "various embodiments" and the like indicate embodiment(s) so described may include particular features, structures, or characteristics, but not every embodiment necessarily includes the particular features, structures, or characteristics. Some embodiments may have some, all, or none of the features described for other embodiments. "First", "second", "third" and the like describe a common object and indicate different instances of like objects are being referred to. Such adjectives do not imply objects so described must be in a given sequence, either temporally, spatially, in ranking, or in any other manner.

An embodiment includes a new model for remote point of sale terminals that reverses this trend of increasing complexity and costs in VMs by taking advantage of the newfound ubiquity of wireless computing nodes that can serve as mobile application platforms. In this model, all or most business intelligence is removed from the VM and is transferred into an interaction between a centralized computing node (e.g., cloud based processing node (distributed or non-distributed) such as, for example, a server) and a community of mobile computing nodes that are held by the consumers at the point of sale.

As used herein, a computing node includes, for example, Smartphones, cellular phones, tablets, distributed and non-distributed computing nodes, notebooks, nodes in the "internet of things" (e.g., internet connected thermostats and lighting fixtures/systems), spectacles with internet connectivity, chronometers/watches with wireless connectivity, and the like.

In an embodiment VMs connect to the mobile computing nodes via a proximity-based wireless protocol that is a standard feature of modern mobile computing node devices. An application running on the mobile computing node communicates to the central server through, for example, 3G/GPRS and/or Wi-Fi networking. This network forms a distributed application network for one or more VMs (e.g., an operator may operate a fleet of VMs) yet centralizes all or most business intelligence and management functionality to the server node/nodes. In addition, this network provides for distinct user identification (if desired and in some embodiments) as well as the ability for one-to-one marketing between consumer and brand. However, other embodiments may choose to not provide distinct user identification. For example, as described below, a key or ID may be used that identifies a consumer uniquely but other embodiments may use a group key architecture such that the user is identified as a member of an acceptable group but his or her ID within that group is not uniquely identifiable (e.g., Enhanced Privacy ID (EPID)).

An embodiment includes architecture comprising a simple VM controller (VMC) that is generally equivalent in terms of complexity to conventional electromechanical servo devices. In other words, the embodiment includes a controller with the capacity to actuate and control simple tasks of managing the environment of the machine (e.g., cooling mechanism for the VM) and vending a product (e.g., actuation of controls that make product accessible to the buyer). However, few or no other high-level functions (e.g., currency and/or credit acceptance, record keeping, telemetry, and the like) are performed by the VM. Consequently, only rudimentary electronic systems are present within the VM for these functions now performed on the server and/or mobile computing node.

While an embodiment includes little or no equipment to perform (e.g., currency and/or credit acceptance, record keeping, telemetry, and the like), such an embodiment include a single electronic interface, such as a Bluetooth Low Energy (BLE) transceiver (or the equivalent thereof). A BLE transceiver wirelessly receives command and control actions that are then transferred to the VM. In an embodiment the VM is a standard VM with a conventional multi-drop bus (MDB) based controller card without any coin and/or bill acceptors, without any cashless sales devices, and without any telemetry devices. Instead, there will be a single BLE transceiver device that is attached to the MDB.

In an embodiment, the BLE device may be a very small, battery powered device that has reduced control functionality but still serves as an application endpoint. An embodiment includes a BLE device (e.g., iBeacon by Apple® Inc.) that transmits a proximity "beacon" signal, which is detectable by compatible mobile computing node devices. The BLE device continuously transmits this beacon and is therefore always ready for a transaction. The transmitted beacon signal is used to "awaken" the corresponding application on a consumer's mobile computing node that is in nearby proximity to the BLE enabled VM. In other words, once a consumer is in close enough proximity to a BLE enabled VM; the application will activate and connect to the VM over the BLE wireless protocol. Once this data connection is established, the mobile computing node application serves as a client endpoint for the sales transaction. The application sends requests to the centralized server (e.g., via 3G and/or Wi-Fi) to identify the buyer, authorize the sale, collect the funds, and display marketing or other promotional/loyalty information. Once authorized, the mobile computing node application instructs the BLE device in the VM to vend the product.

The mobile computing node application can serve as the "dashboard" for the transaction itself. Accordingly, an embodiment includes VM with no buttons or user interface (UI) with which a user interacts to select a good. Such a VM may include no such UI, but may still include a display whose interaction with the user is little beyond pure marketing. All user interaction for selecting a vended product in response to a user initiated selection is between the consumer and the mobile computing node application. In such an embodiment the VM is little more than a cooler (for VMs that vend goods that need to be cooled) with an electronic door or product lock mechanism for dispensing a good, under the control of the BLE and mobile computing node application. As used herein, a UI is defined as the junction between a user and logic including an interface coupled to a set of commands or menus through which a user communicates with the logic.

In an embodiment the BLE device collects and caches operational information regarding that individual VM. This information may include alert/exception data, visits by technicians and product restock personnel, and/or any event data that occurs during the period of sales inactivity. This information will be relayed to the mobile computing node application upon an established BLE connection with the mobile computing node. After this connection the information will be relayed to a central server by the mobile computing node application. All or some available information (e.g., physical location of the VM and/or user, user identification, and the like) will be collected by the application and forwarded to the central server with each transaction.

In a similar fashion, in an embodiment any information that the central server wishes to send to a specific VM may be formatted and cached on the server (which may include one or more computing nodes) awaiting a future consumer session with that VM. During that future session the server will transmit the information to that specific mobile computing node application, which will in turn relay that information to the VM itself. An example embodiment of this function would be updating the content of a marketing display for a VM or a cooling temperature for inventory within the VM. In the case of updating the marketing display, the server would format the desired display contents to accommodate a display included in the VM (e.g., consider resolution specification/capabilities of display in VM) and await a transaction session. During this session, the content would be relayed to the VM via the mobile computing node and BLE connectivity.

An embodiment includes a process for dynamic pricing and marketing activities. Information regarding sales price, promotions, loyalty discounts, coupons, and the like are stored on the server on a VM by VM basis (or group of VMs by group of VMs basis) and/or per consumer basis (or group of consumers basis) and are dynamically displayed in the mobile computing node application at the instance of the sale event.

Many or all of the embodiments described above eliminate the need for individual network connectivity for each VM. Instead, consumers opt into this system by downloading and enabling the mobile computing node application. Their network attached mobile computing nodes then become the "backhaul" network (between the VM and server) for some or all telemetry, sales authorization, marketing and loyalty programs, location verification of the VM, and the like.

Many or all of the embodiments described above could scale upwards or downwards in device and functional complexity. As mentioned above, the BLE device may be a small battery powered device. In an embodiment using such a BLE device, the BLE device would be low cost and considered almost disposable. This would allow for a ubiquity of these BLE devices across a very large pool of remote assets. An example would be to enable monitoring and user interaction for non-intelligent drink and food cooler/refrigerator devices. The use of the BLE device in this embodiment serves to elevate the function of a simple cooler or refrigerator to the role of a simple vending machine, albeit, an unconventional form of a VM. Proximity based mobile computing node application and central server monitoring for these devices will enable applications such as remote machines and inventory management, user identification, brand marketing, loyalty and rewards program.

An embodiment uses a BLE device with a "post mix" machine, which include machines used in convenience stores and restaurants where the drink/product is dispensed into a cup or container. An embodiment includes placement in display materials that are used in retail stores and supermarkets. These promotional materials are enabled with a BLE device located inside the retail environment close to the product on the shelf. For example, the VM could be located in a store window on a sidewalk where consumers may view a product in the store window (e.g., after the store has closed for the evening) and nevertheless purchase the product using the BLE enabled unit.

The addition of a BLE beacon to these use cases and the ability to activate an associated mobile computing node application opens a wide range of marketing, loyalty, and social networking activities that would enable direct brand-to-consumer dialog but do this within the consumer-to-seller/distributor environment. For example, an embodiment relies upon a consumer behavior where the associated application is (1) loaded upon the consumer's mobile computing node, and (2) permission is given by that consumer to actively participate in this network. To guide this behavior, there could be loyalty or promotional campaigns developed that engage the consumer in a rewards-based system, thereby driving their desire to participate. This is a natural application for gamification and rewards-based motivation.

An embodiment leverages the business logic of the vending transaction such that this simplified vending event could be natively integrated into 3rd party mobile computing node applications (e.g., the application could be an embeddable "widget" for 3rd party developer use). For example, an embodiment includes a licensing program that provides consumers with the ability to win free products as a reward for gameplay or other social networking activity. A video game developer embeds the vending application into a game and establishes a system of rewards for gameplay achievements. The products that have been won may then be delivered at the player's convenience at any time of day in any location where there is a BLE enabled VM (or at specific locations of specific VMs located at, for example, a sponsor's location). Integration of the application with payment and/or loyalty systems and other back-office systems would be through application program interface (API) connections from a central server.

Thus, many embodiments described herein include the use of opt-in agents to create a back-haul network for remote telemetry and transaction sessions. Such a system transfers business intelligence logic and subsystems out of the remote point of sale device and into external mobile computing nodes. An embodiment includes a VM that is button-less and cash/credit-less such that all consumer interaction with the VM is through a mobile computing node application and all (in some embodiments) financial transactions and/or authorizations take place in cloud-based service providers.

An embodiment provides management of remote assets through an intermittent, proximity-oriented network. Instead of putting a modem in the asset, the VM relies on the IP-connected mobile computing node to "encounter" the asset and then leverage that connection. For example, an embodiment includes a system of delivery for physical goods whereby the consumer is in proximity to any remote delivery terminal. In such a case a user may win a reward on a video game during his commute on a train. Upon exiting the train the user may walk adjacent a VM whereby uses his reward to vend a product from the VM.

An embodiment includes a system of tracking normalized consumption and/or consumer behavior across some or all channels of consumption through proximity-based telemetry. By enabling all outlets of consumption (e.g., vending, retail, restaurants, and the like) with wireless interaction devices, brands may achieve a newfound viewpoint for consumer behavior. Activities such as consumer analysis, product promotion, and/or direct marketing are enabled with this system in a comprehensive "all channels" manner that was heretofore not possible.

FIG. 1 includes a network architecture in an embodiment of the invention. Vending operator 100 is a vending operations entity. For example, this entity is responsible for creating and managing the vending network, creating and managing sales and marketing aspects of remote PoS sales, maintaining stock levels, and/or collecting revenues from operation. Payment Service 101 is an online payment service that provides direct consumer payment via credit card, loyalty program, closed loop (scrip) programs, and the like (e.g., PayPal® or an e-wallet service). Server 102 is a cloud based node (e.g., an internet resident application server) that contains management and control logic for the network of FIG. 1. Mobile software application 104 interacts with element 102 via, for example, standard HTTP/internet protocol where elements 102 and 104 represent a distributed mobile application. Vending device 103 (e.g., a VM) represents one of many vending devices or VMs that comprise a portion of the vending network. Mobile Application 104 represents the application resident coupled to (e.g., via the cloud) or in (e.g., resident in memory included within a chassis or package of the mobile computing node) the consumer's computing node (e.g., Smartphone). Consumer 105 is a user (e.g., human, robot) interacting with element 104 to locate, purchase, and obtain goods from the described system. Application Store 106 includes a delivery mechanism by which user 105 downloads and installs element 104.

Various lines of communications are shown between entities of FIG. 1. Line of communication 116 enables delivery of element 104 to consumer 105. Element 106 may be a third party application site as is applicable to the make/model of the mobile computing node that hosts application 104. In an embodiment element 106 may be a private application site intended for enterprise or private group usage. Line of communication 117 represents the consumer interacting with element 104 via touch screen UI, voice commands, swipe/shake motions, and the like. Line of communication 114 represents the wireless communications link(s) between elements 104 and 103. These may be Bluetooth®, BTL, Wi-Fi, NFC, and the like. Line of communication 115 represents physical contact between elements 105 and 103 as goods are delivered (in embodiments when good is a physical item). Line of communication 113 represents online dialog between elements 104 and 102 in a client/server relationship. Standard mobile computing node data access methods (e.g., 3G/4G and/or Wi-Fi) may be used along with standard internet protocols and transport. Line of communication 112 is the online dialog between elements 101 and 112 with the purpose of authorizing and settling the monetary aspect of vending and retail purchases. This is a secure online service using industry standard transaction protocols. Line of communication 111 is the administration and management interface between elements 100 and 102. Configuration, management, and alert/exception reporting are done over this interface. In an embodiment, business management, planning, and analytics operations for the usage of the vending network of FIG. 1 take place over this interface. It is a standard internet/web protocol and transport system in an embodiment. Line of communication 110 represents the interaction between elements 100 and 101 to receive all payment and settlement information for all sales performed in the network and uses a standard internet protocol and transport interface.

Figure 2:
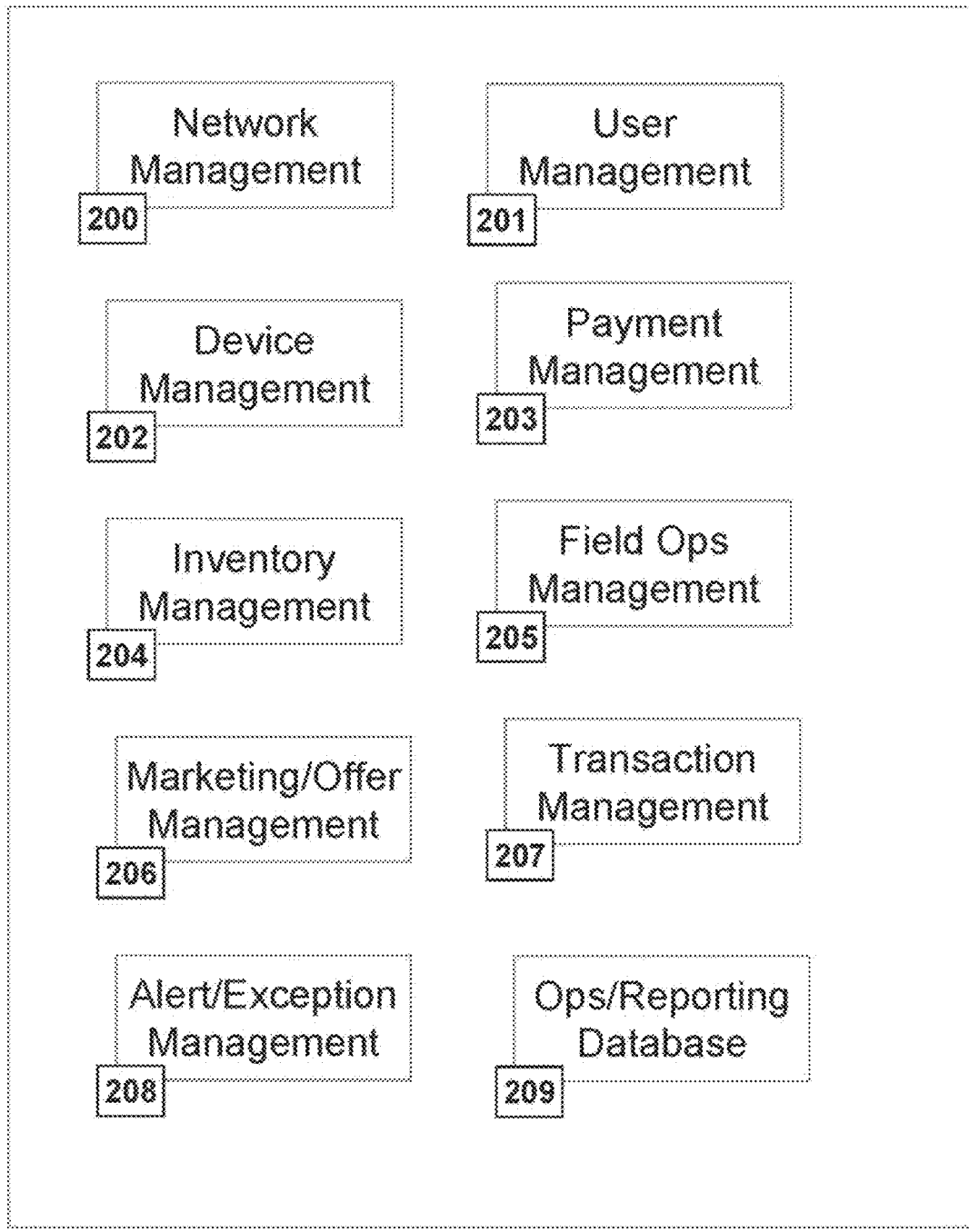
FIG. 2 includes an application server in an embodiment.

FIG. 2 includes an embodiment of vending server 102. In an embodiment application server 102 consists of several modules. Network Management module 200 controls the logical and physical network of vending devices 103 allowing for identification, configuration, and modification of these devices. User Management module 201 manages the subscription and life-cycle state of consumers 105 as they interact with application 104 and vending devices 103 (e.g., operation state as addressed in later figures such as FIG. 5). Device Management module 202 allows for management of a single vending device 103 from the standpoint of inventory/stock, exceptions and errata, sales marketing performance, and the like. Payment Management module 203 provides a reporting and reconciliation interface to the third party payment service 101. Inventory Management module 204 provides both reporting and analysis for current inventory contained both within operator 100 resources (warehouse and fleet) as well as within the vending network of element 103 devices. Field Operations (Ops) Management module 205 represents scheduling and control of all field service operations (e.g., scheduling technicians to restock certain vending devices 103 at certain times) needed to maintain stock and operation for the network of element 103 devices. Marketing/Offer Management module 206 allows direct to consumer marketing and offerings to user 105 via interaction with element 104. Transaction Management module 207 represents a workflow and user interaction manager that serves to define and control the user experience of user 105 in conjunction with element 104 through the entire location, purchase, and delivery process of remotely purchased goods. Alert/Exception Management module 208 represents the collection, assignment of priority, and delivery of events and exceptions (e.g., errors such as a lack of inventory in a vending device or a malfunctioning cooling system in a vending device 103) that occur within the vending network of FIG. 1. Ops/Reporting Database module 209 represents the online storage of transactional information, operations information, as well as providing business analytics reporting.

Figure 3:
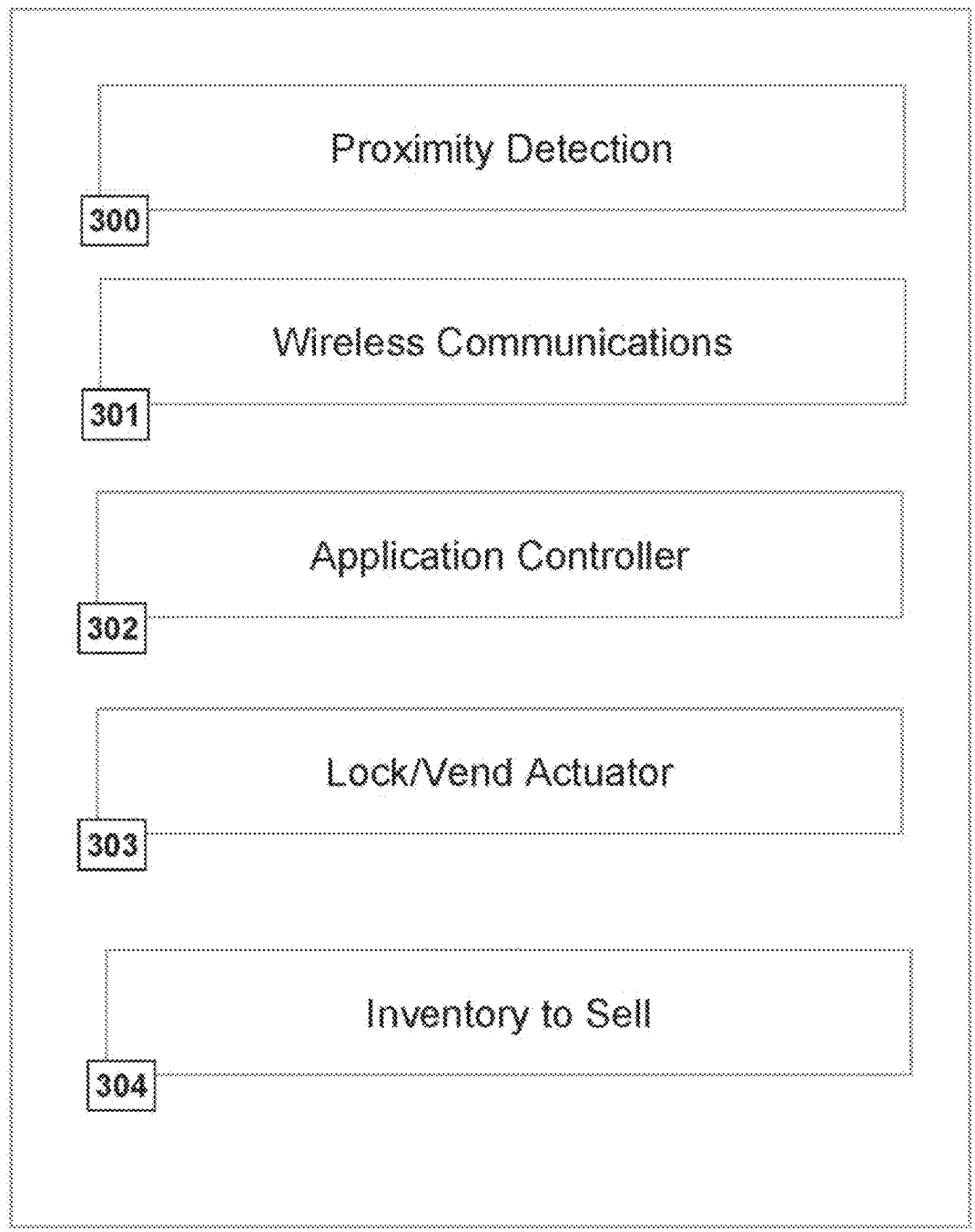
FIG. 3 includes the vending device in an embodiment of the invention.

FIG. 3 includes an embodiment of vending device 103. In an embodiment vending device 103 is a stand-alone microprocessor controlled electromechanical device including various subsystems/module as follows. Proximity Detector module 300 (e.g., BLE beacon) detects the presence and relative distance of mobile computing node devices that have been enabled with application 104. Wireless Communications module 301 enables secure, authenticated, wireless communication dialog between elements 103 and 104. Element 103 has wireless communication systems and may only communicate to an enabled and nearby (e.g., within 450 meters) instance of element 104. These wireless communications include things such as NFC, Bluetooth®, and the like. Application Controller module 302 utilizes element 301 to provide application client functions to elements 104 and 102 operating in concert with one another. Element 302 is not a stand-alone intelligent device but instead operates only as a slave/client of elements 104, 102. Lock/Vend actuator 303 translates application commands to physical electro-mechanical actions such as triggering a lock or solenoid/servo device to deliver a product to user 105. "Inventory to Sell" module 304 represents the physical or logical goods being offered and sold to user 105 via the vending network of FIG. 1. Element 304 may represent actual physical goods such as consumable food/drink products or may represent virtual products such as mobile phone "minutes", transportation tokens, and the like. In the case of the latter, element 103 serves to limit access to the delivery method of the virtual good. An example of this would be a virtual good delivered by a one-time use quick response (QR) code, which is contained and/or managed by element 103 as an embodiment of element 304. For example, device 103 may include a display that displays a QR code (after purchase) that includes keying material that unlocks additional cellular phone minutes, access to movies on the node running application 104, and the like.

Figure 4:
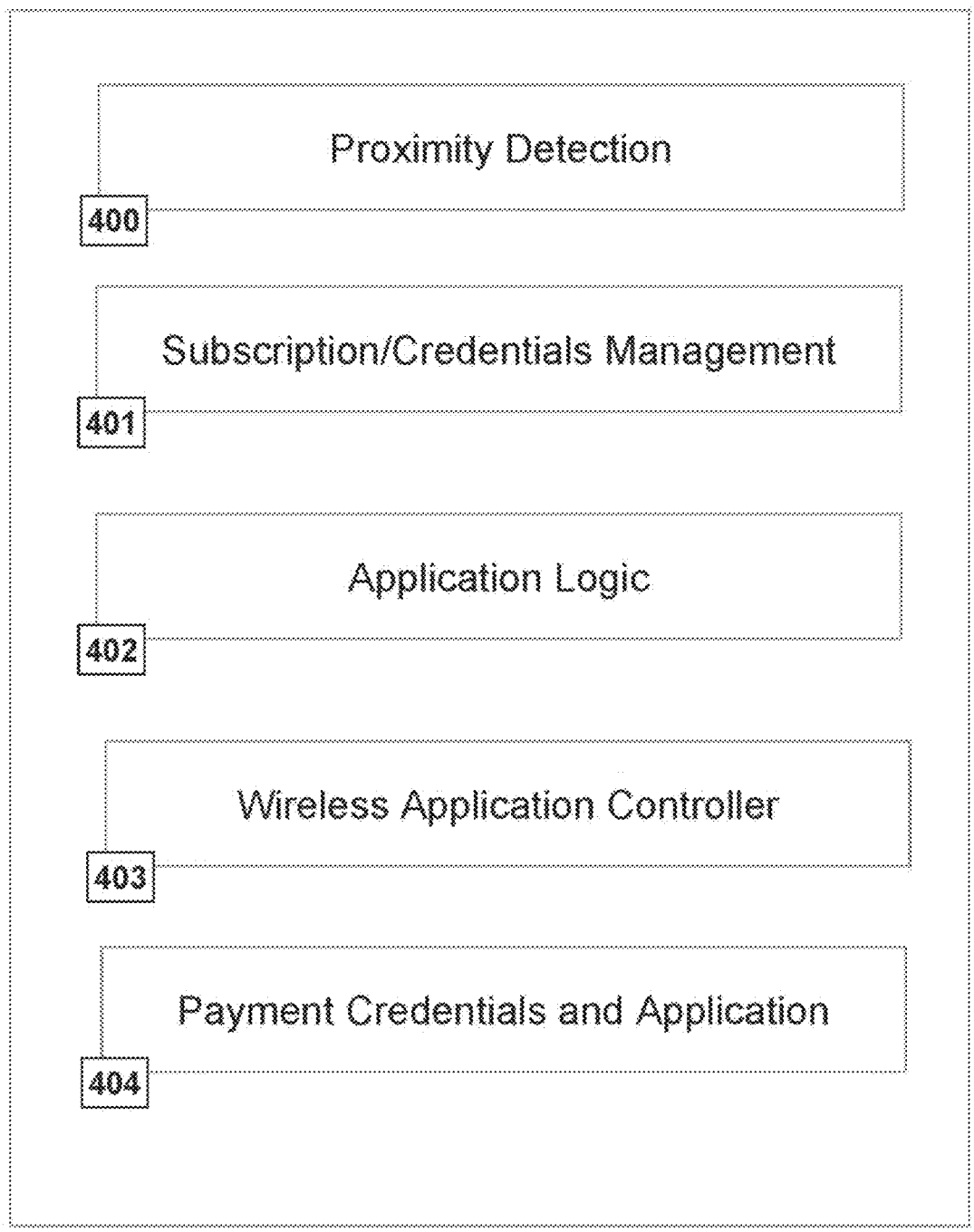
FIG. 4 includes a mobile application in an embodiment of the invention.

FIG. 4 includes an embodiment of mobile application 104. Mobile Application 104 is logic (e.g., a computer application) that resides within a computing node (or couples to a computing node) and utilizes the services present in the computing node (e.g., 3G/4G Smartphone). Application 104 consists of the following subsystems/modules in an embodiment. Proximity Detection module 400 utilizes a wireless beacon or other signal to detect the presence of vending devices 103 as the consumer 105 and application 104 approach the vending network (e.g., vending device 103). Module 400 identifies individual device 103 units and selects and establishes a dialog with any discreet device 103 it encounters. Subscription/Credential Management module 401 enables consumer 105 to manage and maintain all configuration (e.g., keys, passwords) and preference settings for usage within the vending network of FIG. 1. Application Logic module 402 manages the transaction life-cycle of user 105 throughout all phases of usage of the vending network of FIG. 1 (e.g., retains state of node upon which application 104 operates during a vending operation). Module 402 manages wireless communications and application state for communication with element 102 (e.g., via 3G/4 G communications) as well as wireless control of an instance of element 103 (e.g., Bluetooth®) via module 403 during the remote PoS action. Wireless Application Controller module 403 performs direct control of element 103 via modules 301 and 302. Module 403 is the "master" role to the "slave" role of element 103 and performs layers of application logic (e.g., wireless protocol, identity, security, user and device location, logical commands and operations, and the like). Payment Credentials and Application module 404 represents the credentials (e.g., account information) of the individual/group of individuals (e.g., a family that shares a group key) 105 as they relate to the third party payment service 101.

Figure 5:
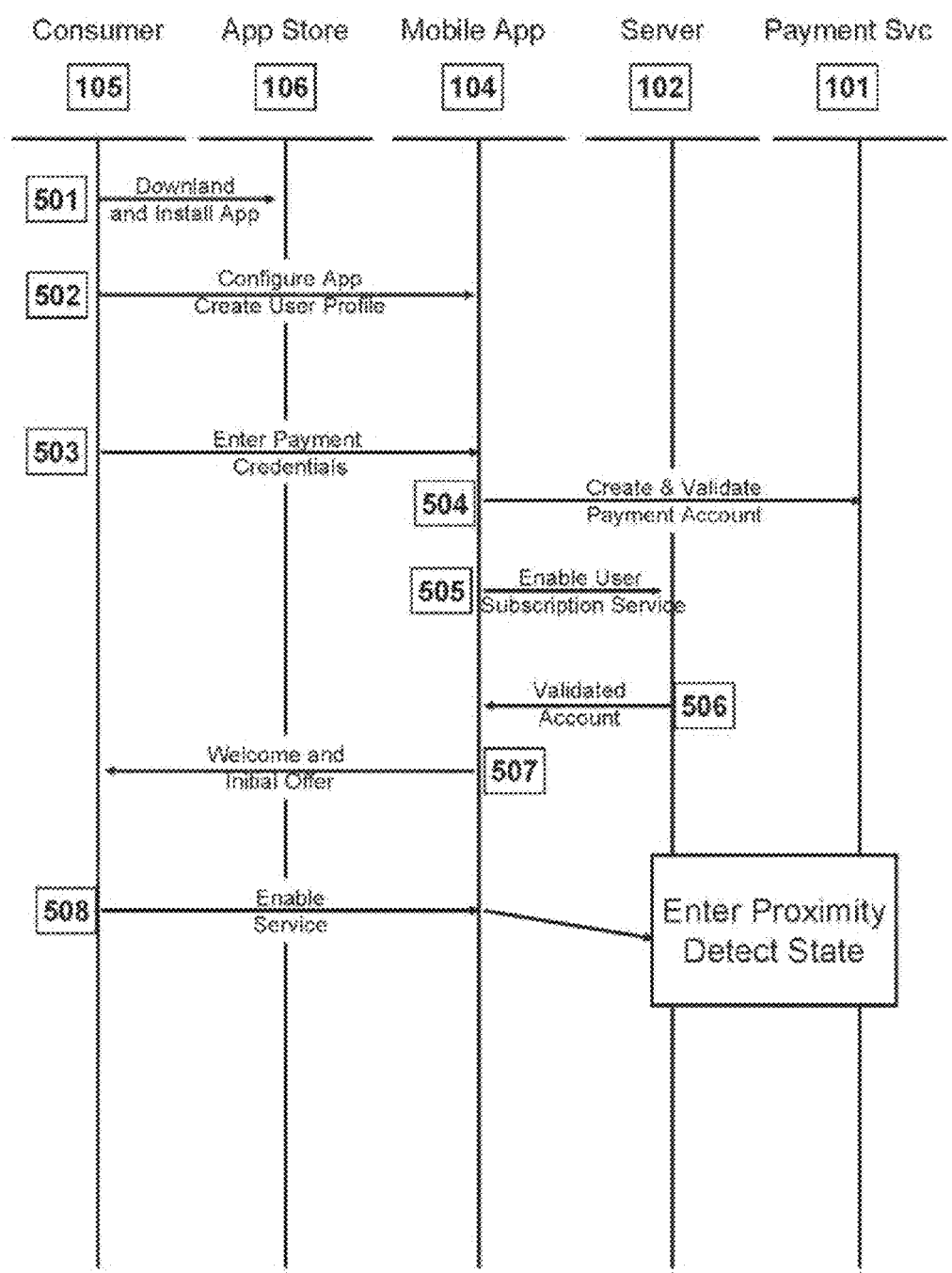
FIG. 5 includes a process for application installation in an embodiment of the invention.

FIG. 5 includes a process for application 104 installation onto a computing node in an embodiment of the invention. Mobile application 104 is installed onto the user's mobile computing node based upon consumer demand. The service will be marketed and new users will be directed to the application store 106 that is applicable to the specific mobile computing node manufacturer. Consumer 105 will initiate the download and install of the vending mobile application 104 by using standard practices (element 501) of the application store 106. Once installed consumer 105 starts application 104 and begins to complete all required information for operation (element 502). This may include user identity (ID), preferences, and social networking information. The next phase of configuration allows consumer 105 to create online purchase credentials (element 503) with internet based payment service 101. In an embodiment these credentials are not stored in 104. Service 101 provides an API through which user 105 interacts with elements 104 and 101. For example, at element 504 application 104 creates and validates payment account information with service 101. At successful conclusion of element 504, element 105 has a validated account within element 101 that may be used to authorize purchases and settle funds for such purchases online. Upon successful payment validation, element 104 creates and enables a service account (element 505) for user 105 within the vending service provider 102. Successful service account creation (element 506) results in graphical and/or audio feedback (element 507) provided by element 104 to user 105 and the initiation of service within the vending system. Application 104 engages roving service (element 508) whereby application 104 enters proximity detection mode/state until the presence of vending devices 103 is detected (e.g., device 103 awakens application 104).

Figure 6:
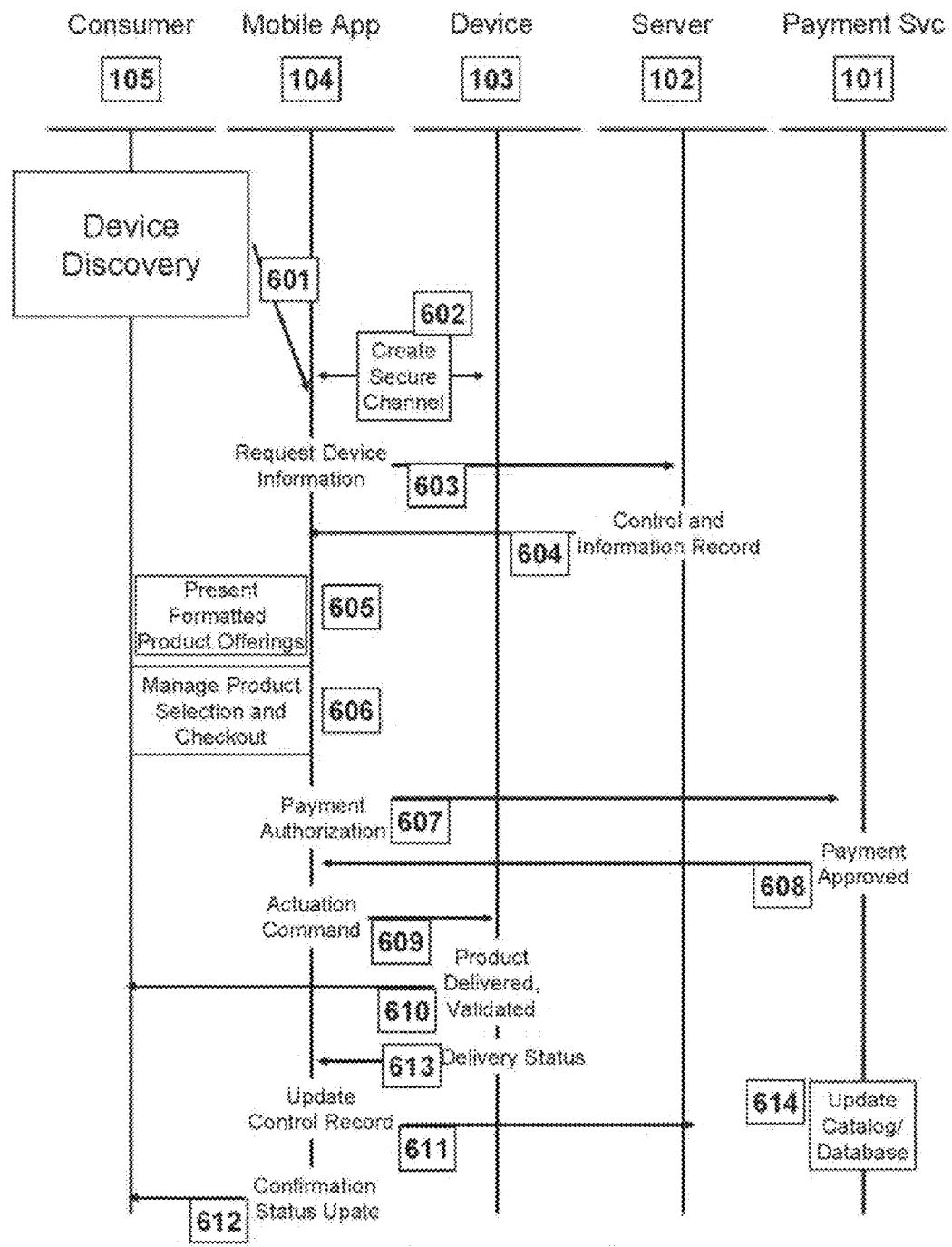
FIG. 6 includes a process depicting a basic user experience in an embodiment of the invention.

FIG. 6 includes a process depicting a basic user experience in an embodiment of the invention. After device 103 discovery by vending device/machine 103, vending device 103 and mobile application 104 enter into Device Discovered state (element 601) and establish a secure communications channel (element 602) as described elsewhere herein (e.g., using a Diffie-Hellman based key exchange technique). For the purposes of description of this embodiment, it is assumed only a single device 103 has been discovered but the description also applies to the processing of multiple devices 103 (i.e., device 103 may be in Device Discovered state with more than one device 103 at the same time). Element 104 requests the device information record (element 603) from element 102. This record contains pertinent information regarding element 103, such as inventory on hand, pricing, marketing/advertising content, and the like. When element 104 makes this request, the request includes ID information for user 105. Element 102 uses this user information to generate preferences, user messaging, or other personalization information for user 105. Some or all of the requested information is returned (element 604) to element 104 by element 102. Element 104 then utilizes the received information to present product offering(s), loyalty/preference suggestions, marketing/advertising, and the like to user 105 (element 605). An embodiment of this operation is described in, for example, FIG. 13. Ultimately, user 105 makes a product selection for purchase, chooses the desired payment method, and proceeds to "checkout" (element 606), which is the actual purchase event. Element 104 formats an online payment transaction in the format of the requested payment method and sends this transaction to the online payment gateway for element 101 (element 607). Element 101 then processes the payment request and returns either "authorized" or "not authorized" status. For this description, it is assumed that element 101 returns "authorized" status to element 104 (element 608). Upon receipt and validation of the payment authorization by element 104 a delivery/vend actuation command (element 609) is sent to element 103 (from application 104) to deliver the physical goods. Note that element 609 will be specific to the type of device 103 and to the type of goods delivered. For the purposes of this description, element 609 is considered to be a remote command to unlock a door or drawer that contains the product to be purchased (or in other embodiments, for example, display a QR with purchased content encoded therein, and the like). Upon receiving actuation command (element 609), element 103 performs the action requested and the product is delivered (element 610) and its delivery is validated by element 103. This validation may occur in several forms. In an embodiment element 103 has an array of sensors, such as optical sensors or weight measurement sensors, which detect product removal from 104. User 105 receives goods (element 610) and the validate delivery status is relayed (element 613) by element 103 to element 104. Element 104 formats a complete sales session and transaction record and transmits (element 611) this information to element 102. Element 102 utilizes this information to update all information (element 614) related to elements 105, 104, 103, 101. This portion of the process ends with element 104 displaying a Confirmation/Thank You user interface (UI) to user 105 (element 612) after which, all devices return to normal state.

Figure 7:
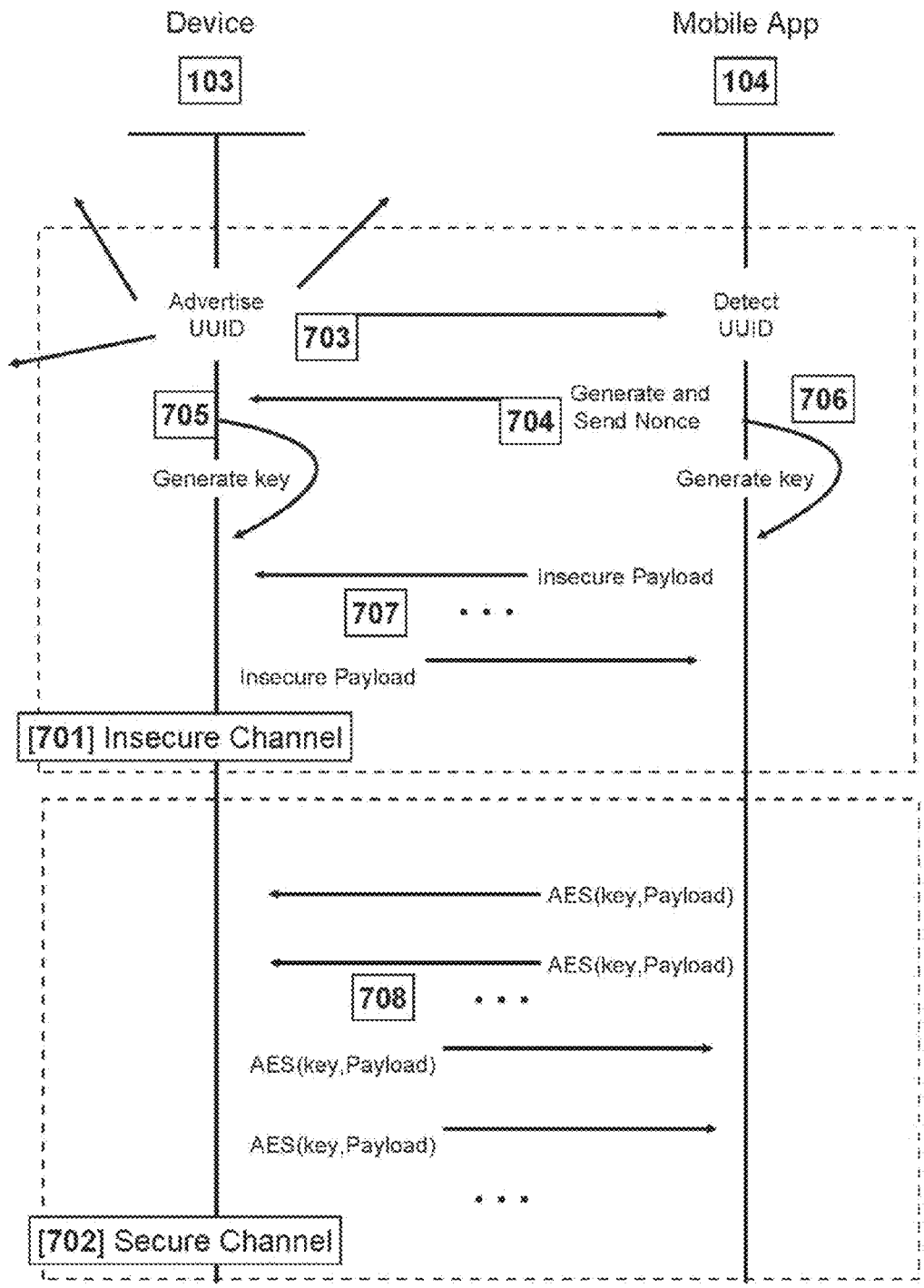
FIG. 7 includes a process for creating a secure channel in an embodiment of the invention.

FIG. 7 includes a process for creating a secure channel in an embodiment of the invention. Application 104 and vending device 103 require a secure communication channel (element 702) to exchange purchase and monetary information with each other. In an embodiment there is also the need for a persistent insecure channel which will be used to enable key exchange and the creation of the secure channel. The following sequence may be used for technology (e.g., BLE) where services may be defined such that a secure service and an insecure service are provided. In a normal state, element 103 will advertise (over insecure channel 701) a locally stored unique identifier (UUID). As application 104 remains in Proximity Detect mode and appears within signal range of an element 103 device(s), element 104 will detect the UUID advertisement upon close proximity (element 703) to device 103. Element 104 will validate the format of the UUID and generate a cryptographic nonce value. Element 104 will relay the nonce to element 103 via the insecure channel (element 704). At that point, both element 103 and element 104 will independently generate a key value using the UUID, the nonce, and a proprietary hash/encode (elements 705, 706). The logic of this method represents a shared secret between elements 103 and 104 and will result in the identical key value being generated independently by elements 103 and 104. Various embodiments may use varying protocols to generate symmetric keys (e.g., Diffie-Hellman, SIGn and MAc (Sigma), and the like). At this point, elements 103 and 104 may begin using secure channel 702 by utilizing the derived keys to encrypt payloads for all traffic over this service (element 708) using, for example, Advance Encryption Standard (AES) and the like. Note that insecure payloads may be exchanged via channel 701 at any time (element 707). Element 104 may also regenerate the nonce value and resend the key generation command. This allows for increased security by allowing a rolling key value based on time or other event information.

Figure 8:
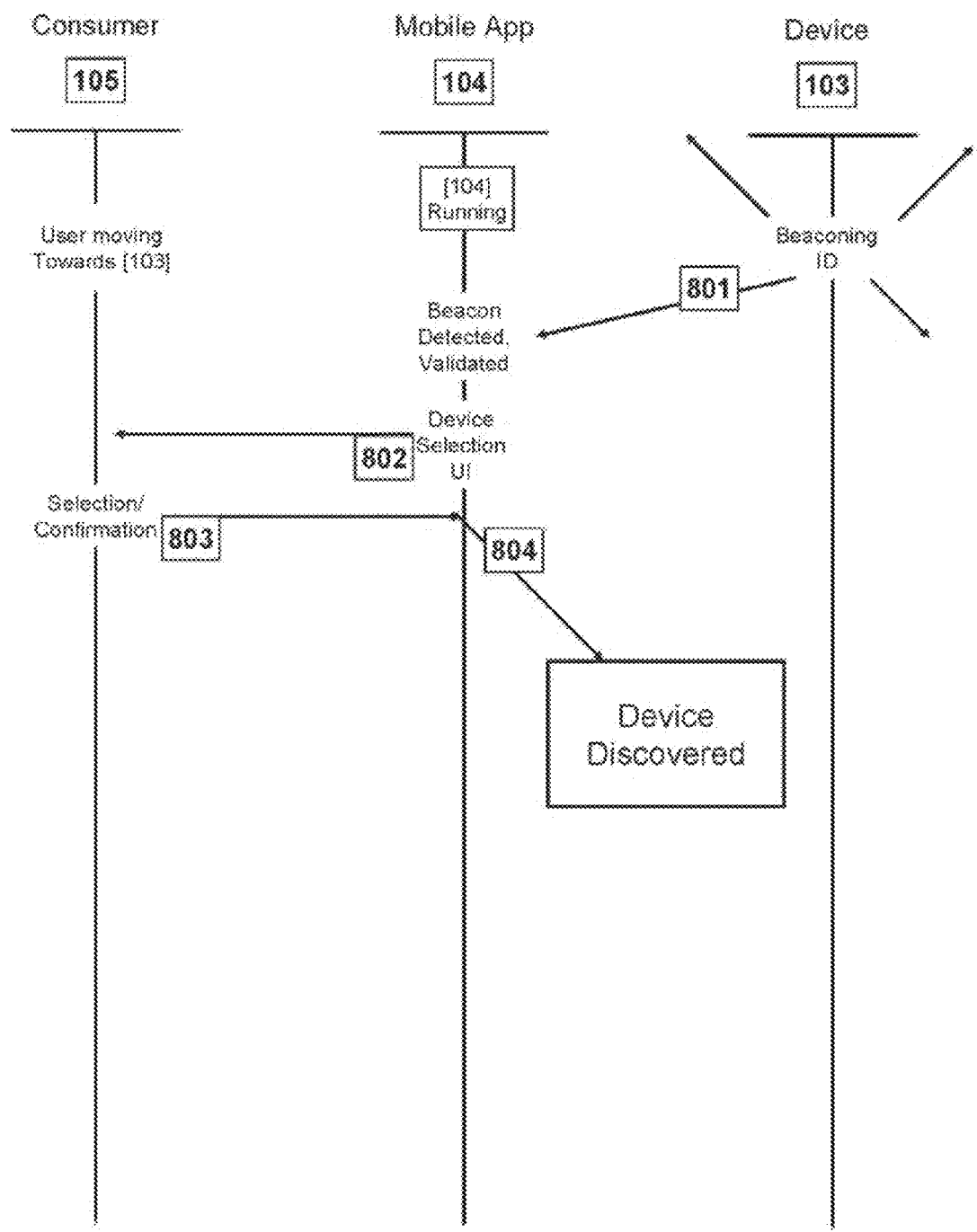
FIG. 8 includes a process for beacon discovery in an embodiment of the invention.

FIG. 8 includes a process for beacon discovery in an embodiment of the invention. Vending device 103 may be discovered and/or located by application 104 in one of several methods. Note that each of these methods may serve to discover one or more devices 103. This means that upon Device Discovery state completion, element 104 may have a list of one or more devices 103 that have been discovered.

In an embodiment, vending device 103 contains a low-level wireless beacon service that is used to detect and enable device discovery. Consumer 105 is in possession of a computing node (e.g., Smartphone) with an executing instance of element 104. As user 105 enters the beacon signal range of element 103, element 104 detects and validates the beacon signature (element 801) to be a valid instance of element 103. In response, element 104 activates and notifies user 105 that one or more instances of element 103 are nearby via a notification and selection screen and/or audio (element 802). User 105 acknowledges interest by selecting and/or confirming action (element 803). At this point, a specific instance of 103 is associated with elements 104, 105 and has been discovered (element 804).

Figure 9:
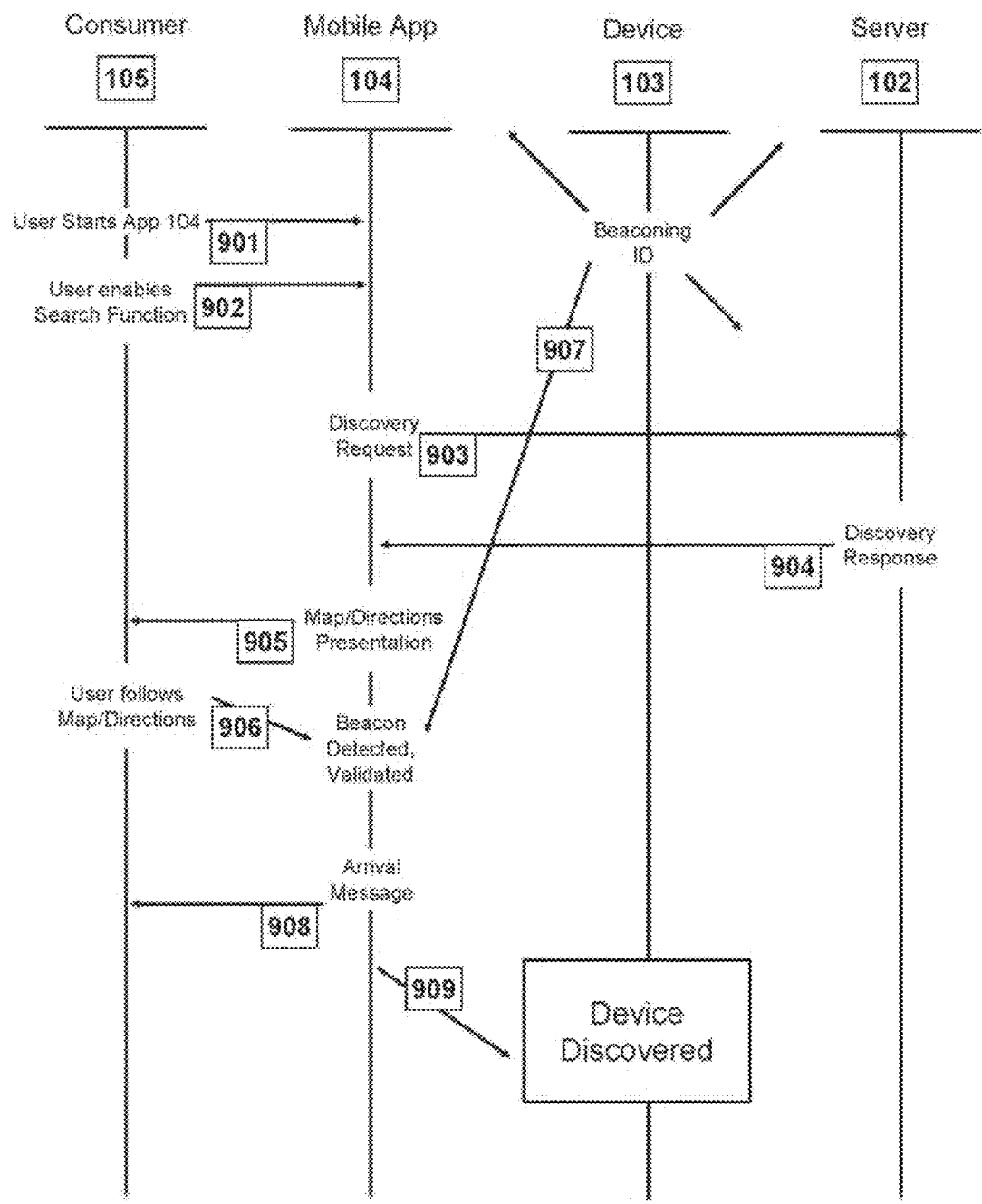
FIG. 9 includes a process for manual discovery in an embodiment of the invention.

FIG. 9 includes a process for manual discovery in an embodiment of the invention. In an embodiment, manual discovery begins with consumer 105 initiating the sequence. User 105 opens element 104 (element 901) and via the UI, initiates the search function (element 902) within element 104. Element 104 makes a Discovery Request (element 903) to element 102. This request contains contextual information about user 105 and element 104 such as GPS derived location, identity, and other search/discovery criteria. Element 102 performs a search of devices 103 that best match the request and responds (element 904) with a subset of devices 103 within the network. Element 104 presents this list to user 105 via the application UI (possibly with a map and directions to various devices 103) (element 905). User 105 responds to this by moving towards the nearest or desired 103 device (element 906). In an embodiment all devices 103 are actively "beaconing" their UUID. Upon user 105 entering the near proximity of one or more of the devices 103, element 104 recognizes and validates the beacon and UUID (element 907). Element 104 presents a "Welcome" or "Completion" message to user 105 (element 908) and elements 104, 103 enter into Device Discovered state (element 909).

Figure 10:
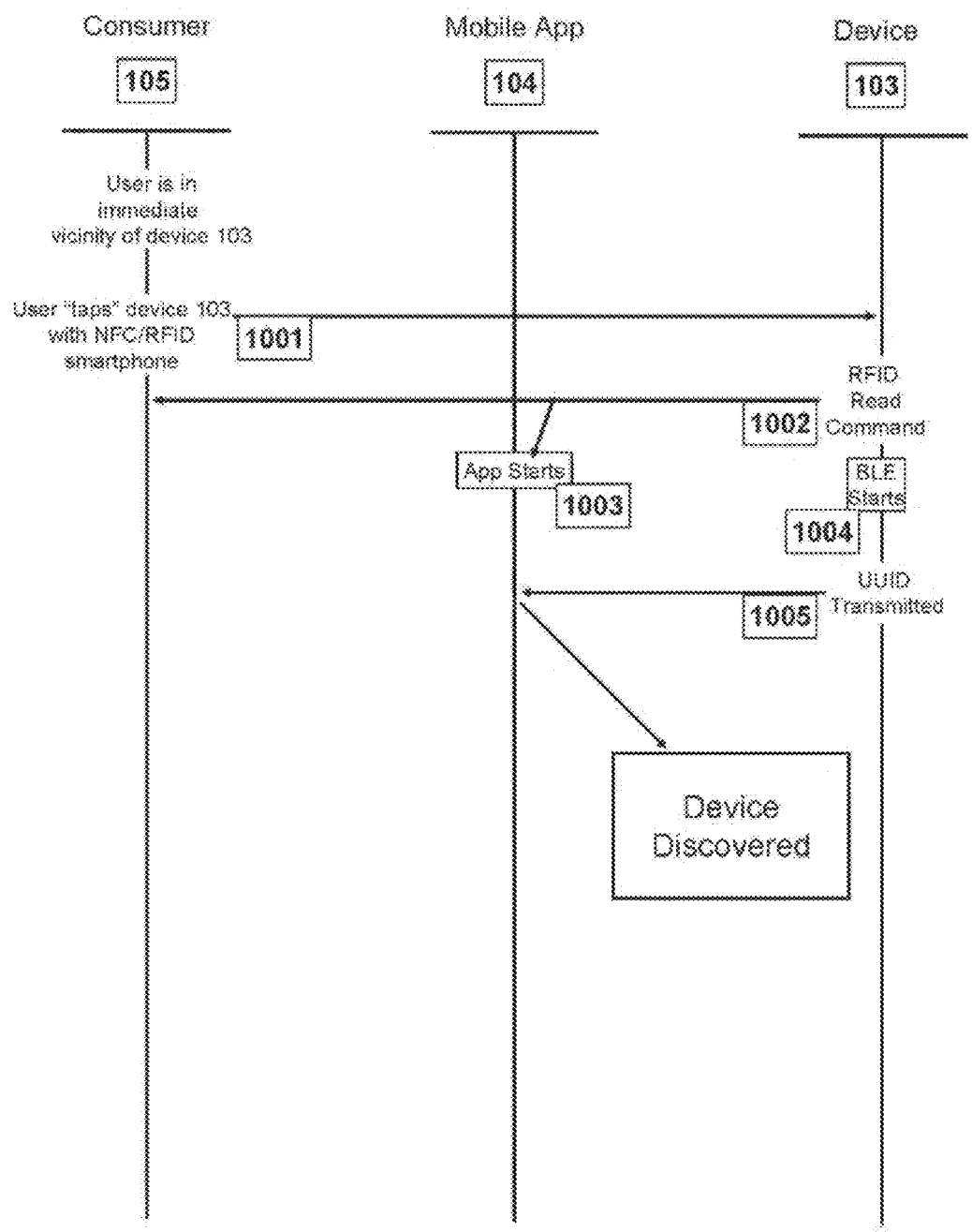
FIG. 10 includes a process for radio frequency identification (RFID)/near-field communication (NFC) discovery in an embodiment of the invention.

FIG. 10 includes a process for radio frequency identification (RFID)/near-field communication (NFC) discovery in an embodiment of the invention. Devices 103 may be discovered by using the RFID/NFC device resident in a computing node (e.g., Smartphone) to initiate contact. User 105 is in close physical proximity with element 103 and begins by touching or tapping (or placing in close proximity) the computing node (e.g., Smartphone) to the RFID reader device (element 1001) in element 103. Element 103, in response, sends the standard RFID read command to the node (element 1002). This initiates two actions: element 1003 starts application 104 running (or validates application 104 is running) in the computing node and element 1004 starts BLE service (or validates the BLE service is started or running). Once elements 1003, 1004 are completed, element 103 transmits the UUID to element 104 (element 1005) and the system enters into Device Discovered state.

Figure 11:
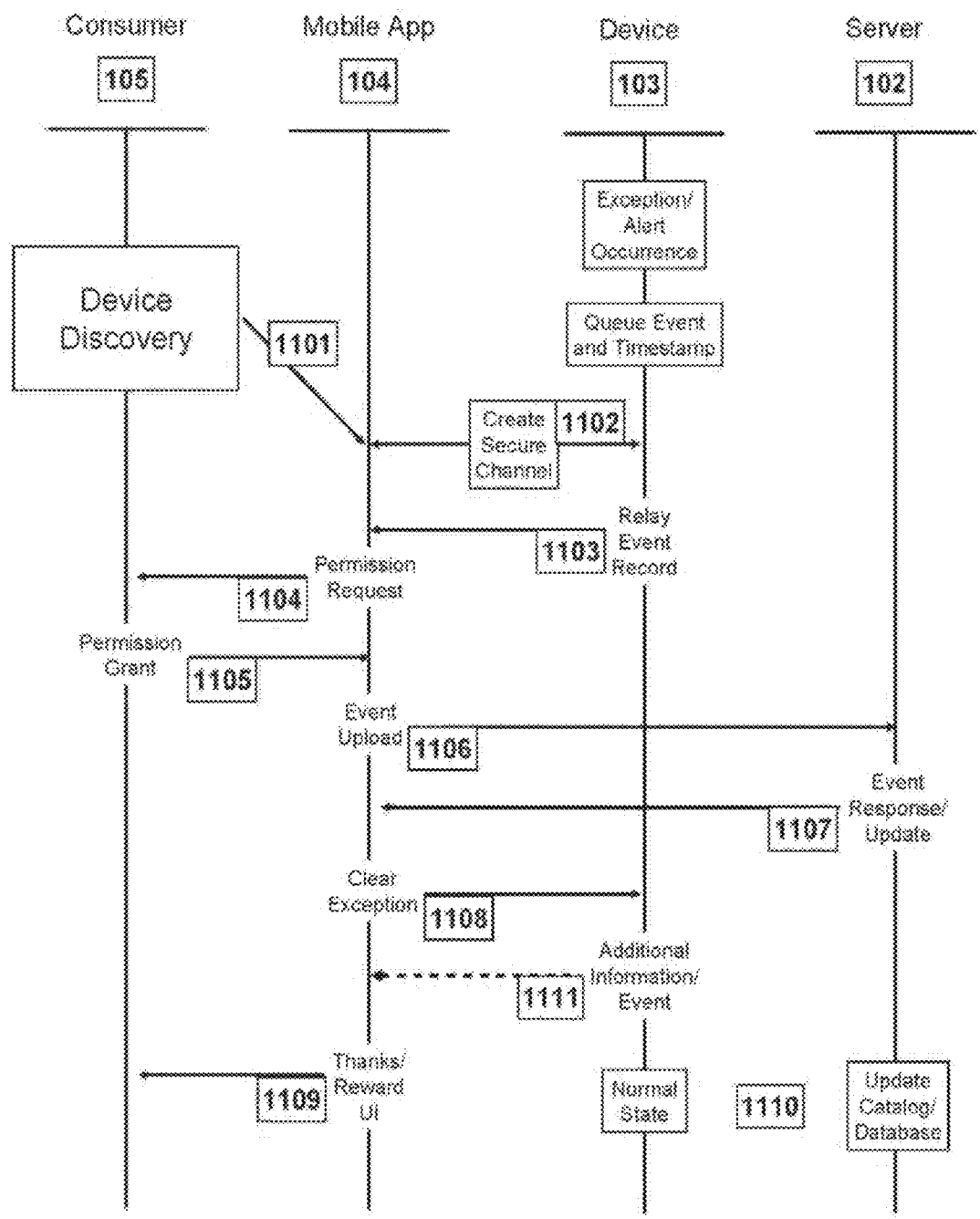
FIG. 11 includes an embodiment for vending Device Exception/Alert in an embodiment of the invention.

FIG. 11 includes an embodiment for Device Exception/Alert in an embodiment of the invention. Since vending device 103 contains no telemetry device capable of WAN communications (in some embodiments), a system of cooperative relay of information is established between element 103 and server application 102 as follows. Element 103 encounters a local alert, exception, or other event (e.g., related to inventory or a cooling system for device 103) that should be relayed to element 102. Element 103 captures information regarding the event as well as ancillary data such as timestamp and other local conditions. Element 103 queues this event in local storage and possibly places the event in a log with other queued events awaiting transfer. User 105 encounters 103 through a normal course of action and enters into Device Discovered state (element 1101) as described above. Elements 104 and 103 establish a secure communications channel 1102 as described above. Upon this connection, element 103 relays some or all queued information to 104 (element 1103). Since this may not be a purchase-driven engagement for user 105 a permission sequence is started where element 104 requests permission to utilize the wireless (e.g., 3G/4G/Wi-Fi) network of element 104 to relay the information (element 1104). Upon permission granted (element 1105), element 104 begins a series of one or more transactions (elements 1106, 1107, 1108) as needed based upon the exception or event from element 103. In an embodiment, a single transaction is as follows. Element 104 transfers a queued event to element 102 (element 1106), which processes the event. Element 102 generates a response, which may contain status and/or commands intended for element 103 to execute. Element 102 relays this response to element 104 (element 1107), which then transfers this information to element 103 (element 1108). Optionally, the command may generate additional information from element 103, which is relayed back to element 104 (element 1111) and sequences 1106, 1107, 1108 will repeat until all commands and statuses have been processed. Element 104 informs user 105 of the completed operation with a UI element (element 1109), which may be combined with a reward for allowing element 104 to utilize the WAN network interface. All devices enter normal state upon completion (element 1110).

Figure 12:
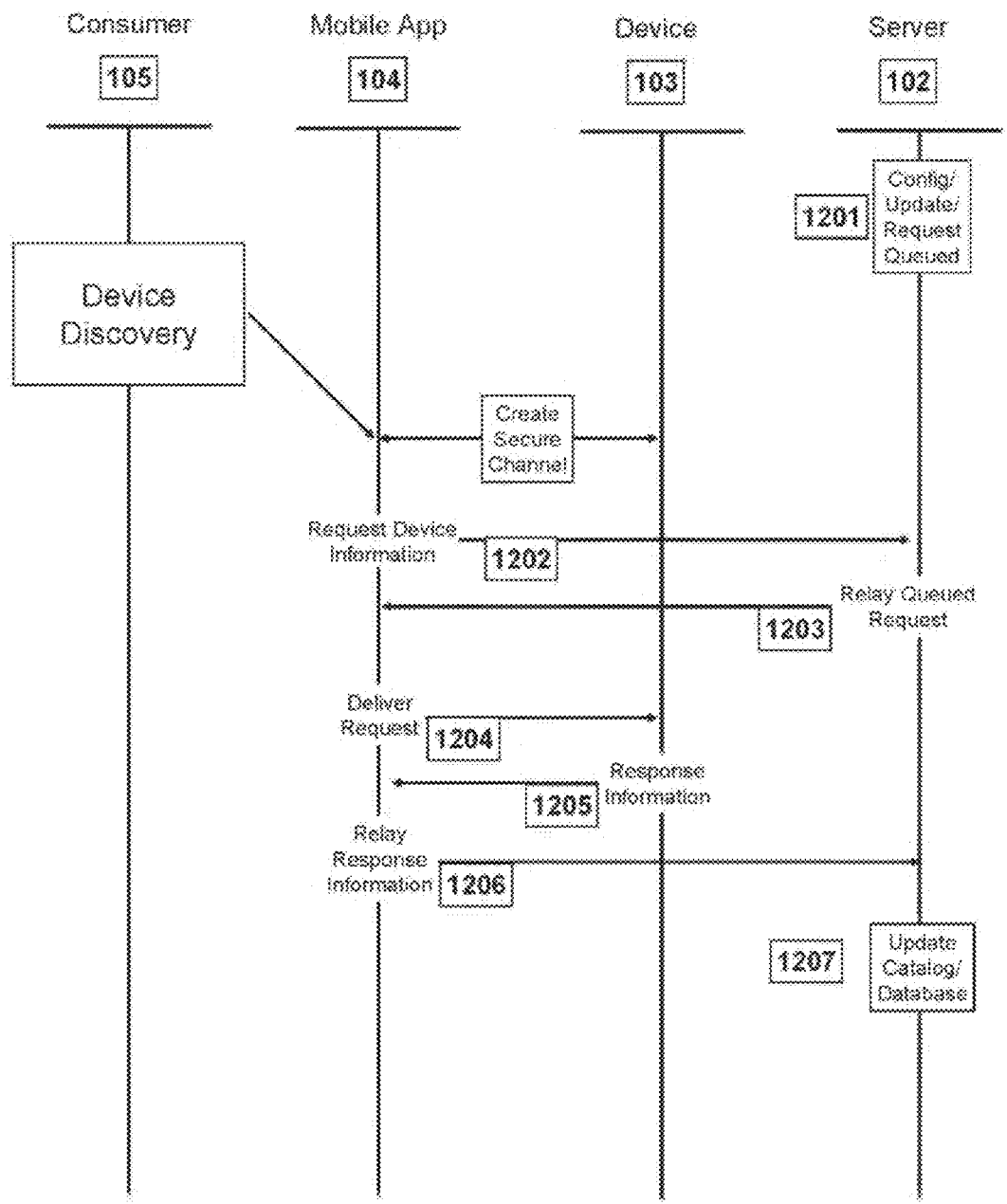
FIG. 12 includes a process to remotely update a catalog/database in an embodiment of the invention.

FIG. 12 includes a process to remotely update a catalog/database in an embodiment of the invention. Since the vending device 103 does not contain a WAN communications device (in an embodiment), a system of cooperative relay of information is established between elements 103 and 102. When element 102 has the need to send a command, configuration, or other information to element 103, the sequence is as follows in an embodiment. Element 102, through user interaction or some time/event based logic, prepares a queued request (element 1201) that is destined for element 103. Element 102 maintains an individual queue for some or all devices 103 and the queue may contain several pending requests. User 105 encounters element 103 through a normal course of action and enters into Device Discovered state as described above. Elements 104 and 103 enter into a secure communications state as described above (see FIG. 7). Upon this connection, element 104 makes a standard Device Request of element 102 (element 1202). Along with the standard device information (e.g., sales inventory, pricing, and the like) element 102 samples the event queue for the specific device 103. If there is information in the queue, element 102 relays that information to element 104 as a part of the response information (element 1203). Element 104 then delivers the queued event information to element 103 (element 1204), which then returns a response to element 104 (element 1205). Element 104 returns the response data to element 102 (element 1206). Element 102 updates the database and device catalog to reflect the delivery of the queued event information as well as the response data (element 1207) and all devices enter into normal state.

Figure 13J:
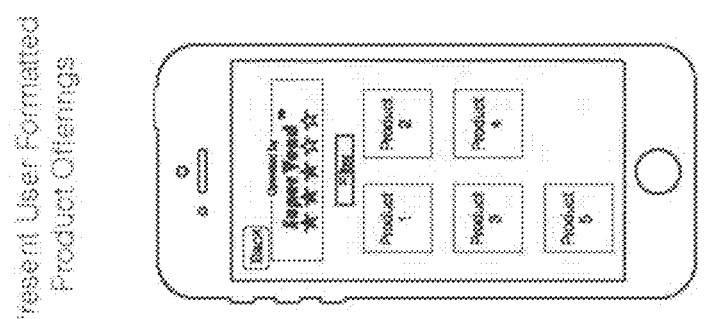
FIG. 13$a$-$j$ depict a series of graphical user interfaces (GUI) that provide a user experience in an embodiment of the invention.
Figure 13I:
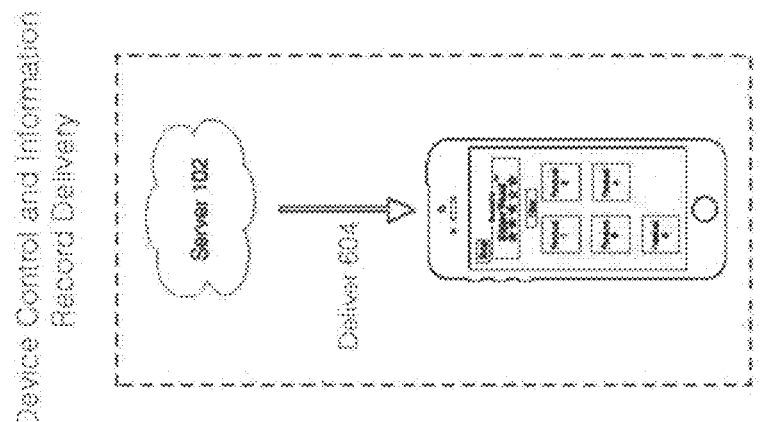
Figure 13H:
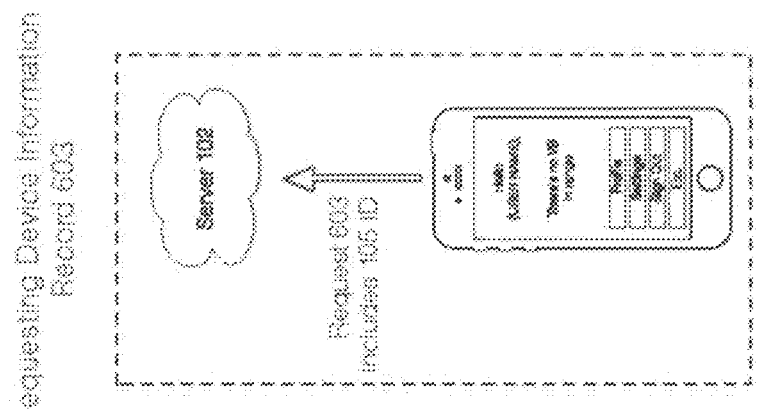
Figure 13G:
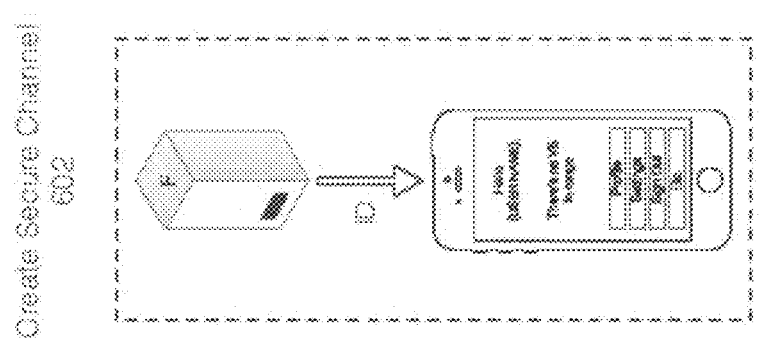

FIGS. 13*a*-*j* depict a series of GUIs that provide a user experience (e.g., see FIG. 6) in an embodiment. FIG. 13*a* depicts a user, who has vending application 104 on his computing node, near a vending device 103 (but unlinked or undiscovered by application 104). The application 104 mentions "VB" which, for purposes of this discussion, is an abbreviation for "vending box". FIG. 13*b* depicts application 104 and device 103 engaged in device discovery (e.g., see FIG. 8 or element 601 of FIG. 6) resulting in elements 103, 104 successfully discovering one another and each entering into Device Discovered state. FIG. 13*c* depicts application 104 and device 103 engaging in creating a secure communication channel with each other (e.g., see element 602 of FIG. 6 and generally FIG. 7). FIG. 13*c* shows "ID" passing between elements 103, 104, which is analogous to block 703 of FIG. 7. FIG. 13d corresponds to element 603 of FIG. 6 and FIG. 13e corresponds to element 604 of FIG. 6. FIG. 13f corresponds to element 605 of FIG. 6. FIG. 13g shows how the same application 104 may also engage a different device 103 (shown in FIG. 13g as device "F" whereas FIG. 13c corresponds to device "A"). FIGS. 13h, 13i, and 13j correspond to FIGS. 13d, 13e, and 13f but, again, relate to device "F" instead of device A. As a result, FIG. 13j shows a smaller choice of products (i.e., six available products for device A but only five available products for device "F"). The smaller product offering may indicate that a formerly available sixth product is now out of inventory so is no longer listed as an option. Also, the backgrounds for FIGS. 13f and 13j differ from one another illustrating how presentation and general marketing can vary from device to device or group of devices to group of devices.

Figure 13M:
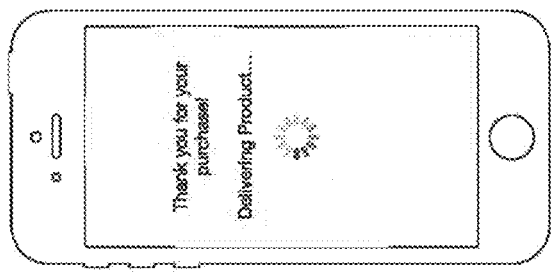
Figure 13L:
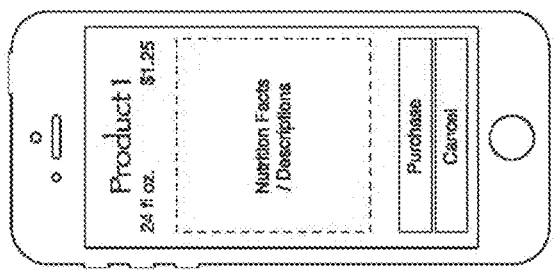
Figure 13K:
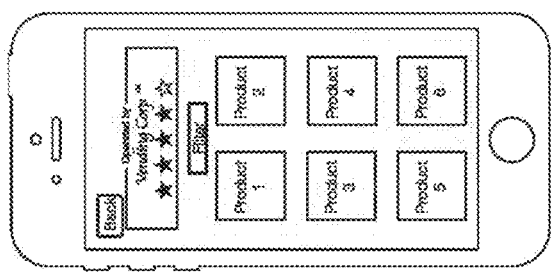

FIG. 13k-m depict a series of GUIs that provide a user experience (e.g., see FIG. 6) in an embodiment. FIG. 13k is analogous to either of FIGS. 13f and 13j. However, FIG. 13l illustrates how product specific information may quickly be made available to the user based on up-to-date information (e.g., dynamic pricing whereby the $1.25 price may lower during "off" hours early in the morning to entice purchases). FIG. 13m illustrates a "Thank you" UI alerting the user to upcoming product delivery.

Figure 14:
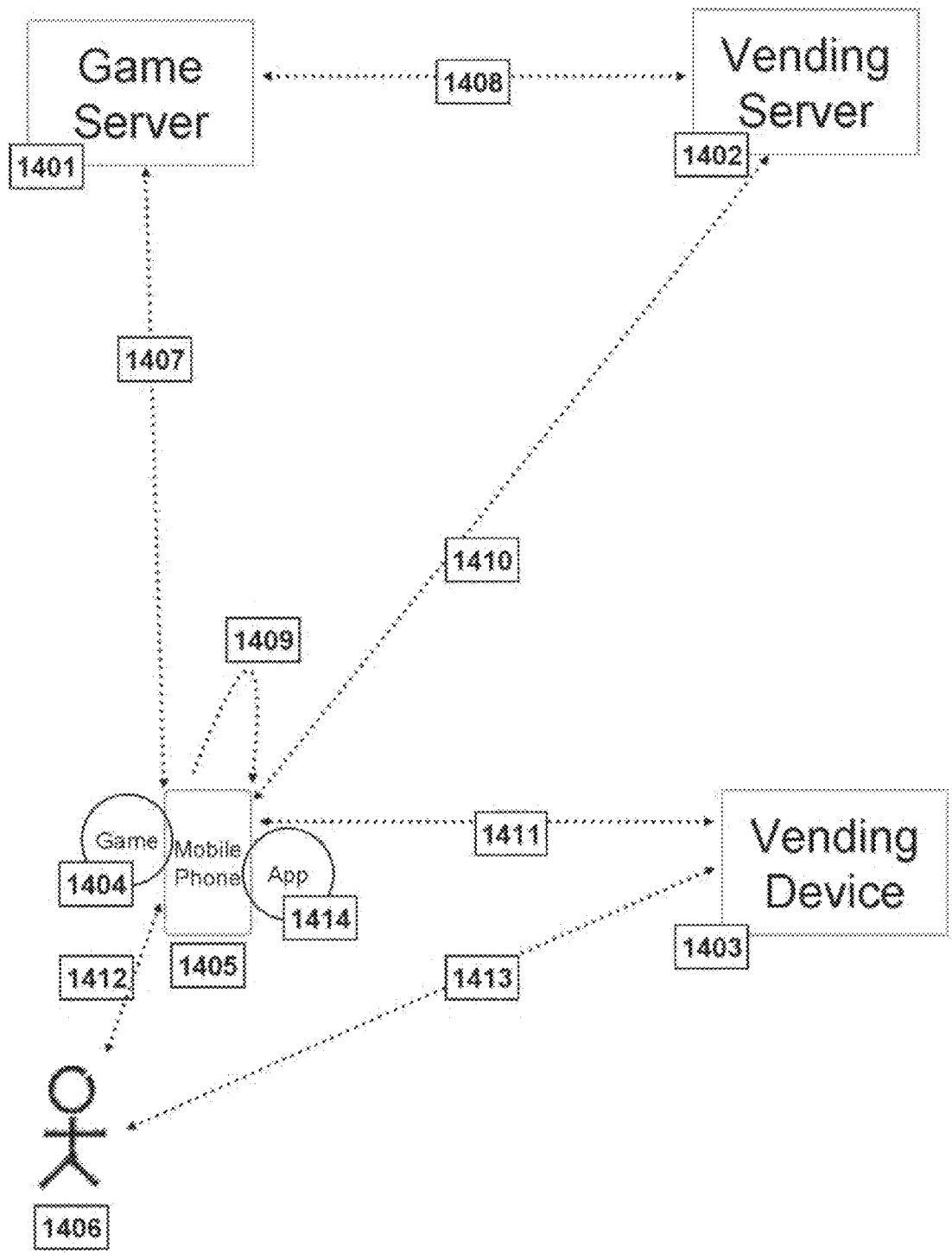
FIG. 14 includes a virtual reward/gift conversion and delivery process in an embodiment of the invention.

FIG. 14 includes a virtual reward/gift conversion and delivery process in an embodiment of the invention. An embodiment enables a reward and delivery mechanism that may be used to convert virtual rewards and/or gifts into physical goods and allow for the remote delivery of these goods remotely to the intended recipient. An example includes a user winning a reward in a mobile video game and then receiving physical goods as he/she encounters a local delivery location. The user/player 1406 interacts (element 1412) with a computing node (e.g., Smartphone) 1405, which contains both a video game application 1404 as well as the vending mobile application 1414 (separate from one another in some embodiments and included one within the other in additional embodiments). As user 1406 completes achievements in video game 1404, rewards are earned in return. Game 1404 may optionally report this status (element 1407, which may be included in device server or vice versa in other embodiments) to game server 1401 or may report this directly to element 1414 via an interprocess call, uniform resource identifier (URI) resolution, and the like (element 1409). In either case, vending server 1402 receives a credit token. In the case of contact from server 1401a dialog between elements 1401 and 1402 is established (element 1408) and the token is exchanged. In the case of direct Application-to-Application contact, element 1414 receives the enablement from element 1404 and then element 1414 contacts element 1402 directly via path 1410. Upon receipt of the token from either source, element 1402 validates the identification of user 1406, processes any loyalty and/or reward policies or rules, and returns a validated response to server 1401 and/or application 1414. Ultimately, element 1404 receives an enablement notification and displays this status to user 1406 (element 1412) showing that user 1406 is entitled to receive a physical goods delivery (or a non-physical good deliver, such as a reward encoded within a bar code such as a 2D or 3D (holographic) QR code) from the vending network. At this point, user 1406 may enter into Device Discovery state as described above. Upon device discovery, user 1406 enters into the flow described in FIG. 6 "Basic User Experience" where flow continues normally until element 606. Instead of a payment selection and checkout sequence, application 1414 displays a credit or "free" product delivery and eliminates elements 607, 608 since no payment is required. Upon validation, application 1414 interacts with element 1403 as normal to actuate and deliver the product (element 1411). Element 1414 updates element 1402 upon completion (element 1410) and all devices enter into normal state.

Figure 15:
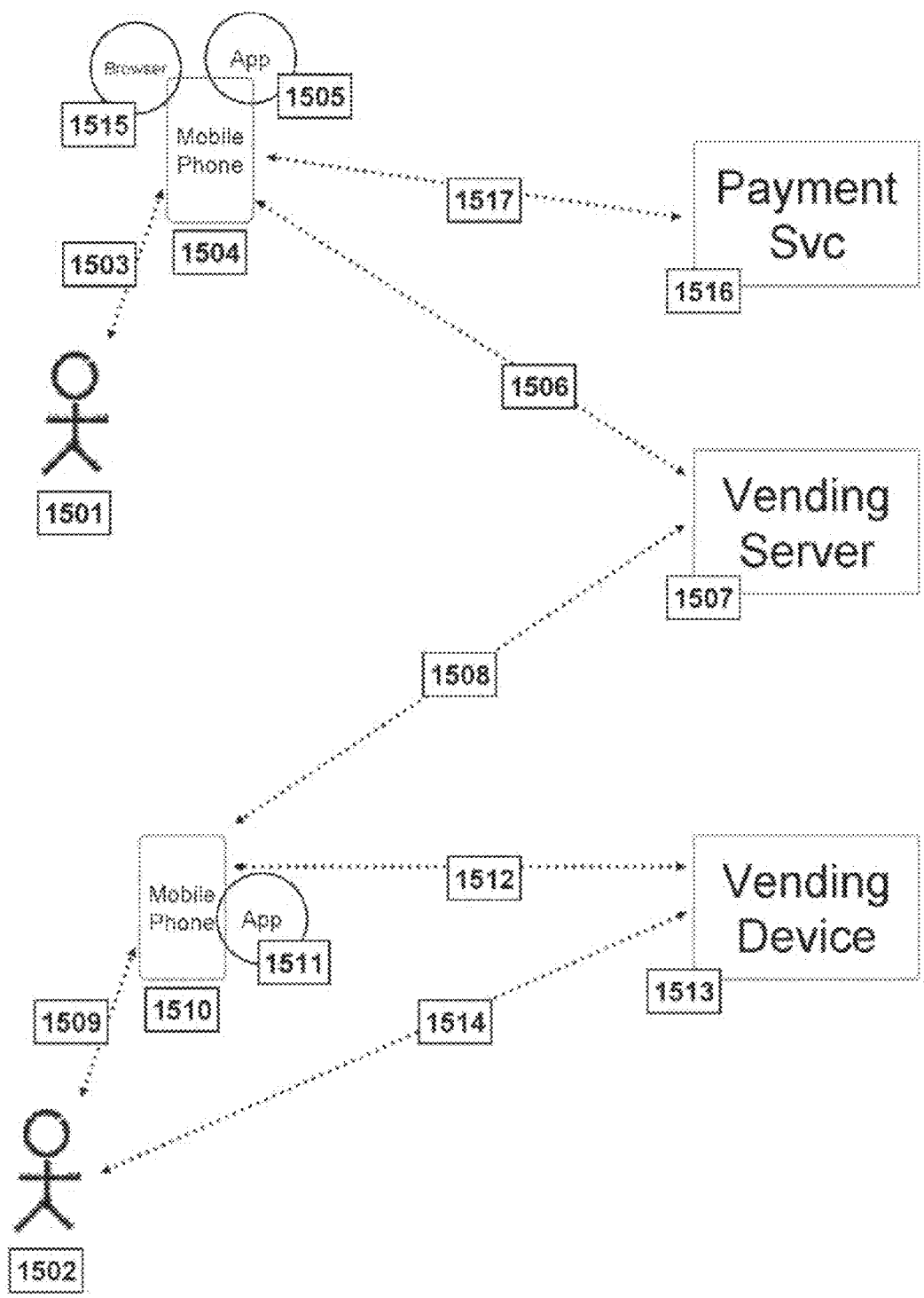
FIG. 15 includes a process for remote delivery of gifted goods in an embodiment of the invention.

FIG. 15 includes a process for remote delivery of gifted goods in an embodiment of the invention. An embodiment enables the secure, validated, remote delivery of physical goods (or a non-physical good deliver, such as a reward encoded within a bar code such as a 2D or 3D (holographic) QR code) from a "gift giver" entity to a "gift receiver" entity where these two parties are in different and even unknown physical locations. An embodiment addresses the gift and reception of physical goods and proceeds as follows. Gift giver 1501 has a computing node (e.g., Smartphone) 1504, which contains vending mobile application 1505 (or a non-mobile version of the application operating on, for example, a personal computer). Alternately, user 1501 may utilize native browser 1515 within element 1504. In the case of application 1505, user 1501 interacts with elements 1505 and 1507 (element 1506) to complete identification, selection of user 1502 as the recipient, product selection to be gifted, and the like. Payment for the gifted goods is accomplished via element 1517 where element 1505 uses stored credentials of user 1501 to authorize payment of the goods using the payment gateway 1516. In the case of element 1515, user 1501 interacts with a web application (analogous to application 1505 in terms of related functionality for processes of FIG. 15), which is served by element 1507. Selection of user 1502 as the recipient, selection of product to be gifted, and payment for product using element 1516 are all accomplished via elements 1506, 1517 using standard HTTP/HTTPS web protocol and web application technologies. In either case element 1507 processes and stores a gift token in a database pending delivery to user 1502. This action results in a transaction-complete UI delivered to user 1501 and optionally a push notification being generated and delivered to user 1502 to announce the availability of the pending gift. User 1502 has a computing node (e.g., internet connected spectacles or watch, Smartphone, and the like) 1510, which contains mobile application 1511 (or couples thereto). User 1502 either receives the push notification or becomes aware of the pending gift delivery upon starting element 1511. In either case user 1502 and element 1511 enter into Device Discovery state described above. Upon device discovery, user 1502 enters into the flow described in FIG. 6 where flow continues normally until element 606. Instead of a payment selection and checkout sequence, element 1511 displays a "gift" product delivery and eliminates elements 607, 608 since no payment is required (but those elements may still be employed if the gift only satisfies a portion of the cost of the to-be-vended good or service). Upon validation, element 1511 interacts with element 1513 as normal to actuate and deliver the product (element 1512). Element 1511 updates element 1507 upon completion (element 1508) and all devices enter into normal state. Optionally, element 1507 may generate a notification back to user 1501 upon delivery to user 1502 as verification.

Figure 16:
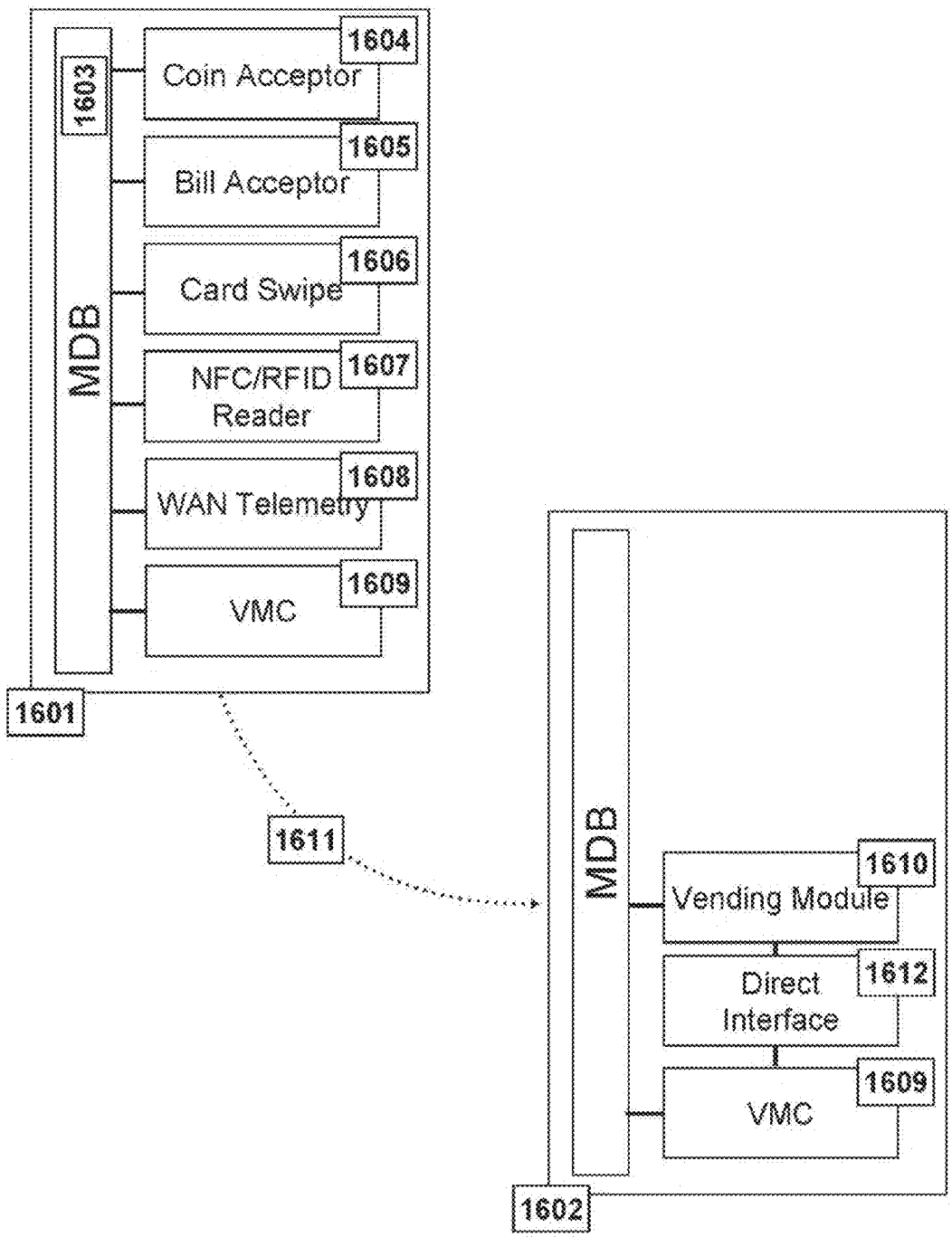
FIG. 16 includes a system for a retro-fitted traditional VM in an embodiment of the invention.

FIG. 16 includes a system for a retro-fitted traditional VM in an embodiment of the invention. An embodiment allows for an existing set of traditional VMs to be enabled for features discussed herein by "retro-fitting" module 1610 (which is novel and an embodiment of the invention) into traditional VM architecture (see element 1601 for an example of a traditional VM architecture). In the traditional architecture, VM 1601 contains a series of peripherals that are connected to a standard bus interface such as the Multi-Drop Bus (MDB)

1603. These peripherals provide individual functions to VMC 1609 and together make up the full feature set of an individual machine. These include, without limitation, coin acceptor/change provider 1604, currency bill acceptor 1605, magnetic credit card swipe reader 1606, smart-card NFC/RFID reader 1607, and WAN telemetry device 1608. With this embodiment some or all of these components (e.g., elements 1603, 1604, 1605, 1606, 1607, 1608, and/or 1609) may be removed and replaced (element 1611) with element 1602, having (in this embodiment) a MDB and attached module 1610. With the replacement of the components described above, element 1610 performs emulation of some or all functional command and response information on the MDB of each of these replaced elements. In this mode, the VMC element 1609 does not require any modification or alteration and instead operates in the same mode as before the replacement. The VMC element 1609 senses valid protocol on the MDB for each component as element 1610 emulates that role. In this mode, full functionality of the vending machine element 1601 is achieved but with far fewer components. Note that the user experience and functionality is different between elements 1601 and 1602 (e.g., basic stand-alone vending vs. mobile computing node (e.g., Smartphone) enabled vending network) but the basic VM unit is the same (e.g., in terms of storage of inventory and servo-motors to open doors and distribute physical goods) and the vendor's investment in the traditional VM structure is preserved. Element 1610 emulates some or all aspects of a stand-alone device 103 (see FIG. 1) by emulating the required set of MDB attached peripherals to adequately control VMC 1609 by using MDB standard commands. Some embodiments provide an additional interface between elements 1610 and 1609 beyond that which is provided through the standard MDB. This interface 1612 may be used for direct control of either 1609 or 1602 as needed. This direct interface element 1612 may include but not limited to a serial DEX interface, direct button/display control, temperature/thermostatic sense and/or control, compressor and/or lighting control, etc.

Figure 19:
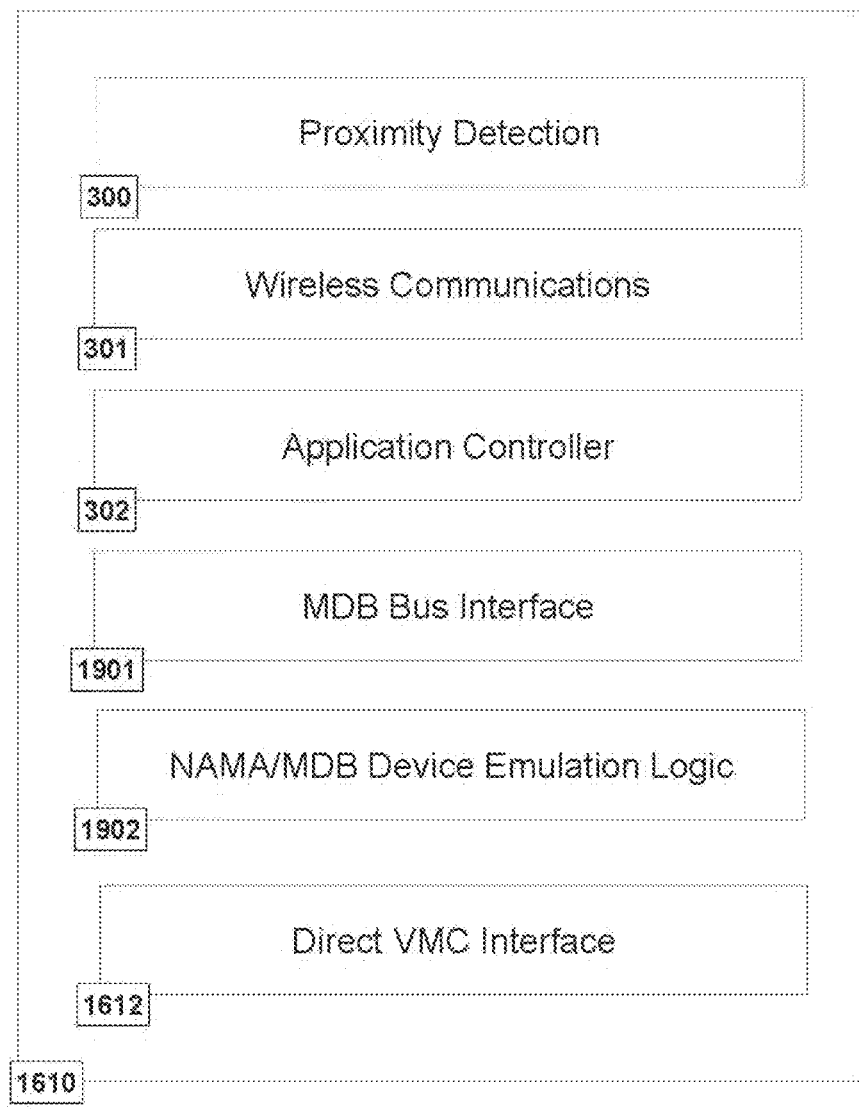
FIG. 19 includes a "retrofit module" in an embodiment of the invention.

FIG. 19 includes a "retrofit module" in an embodiment of the invention. This figure addresses an embodiment of module 1610, addressed above with regards to FIG. 16. Module 1610 contains elements from an embodiment of vending device 103 such as, for example, proximity detection module 300 (see, e.g., FIG. 8), wireless communications subsystems and session establishment module 301 (see, e.g., FIG. 7), as well as application controller 302, which is capable of being the slave module to mobile application 104. Embodiments of modules 300, 301, 302 and/or the process performed by such modules are described above. In addition, an embodiment of module 1016 contains a National Automatic Merchandising Association (NAMA) Standard MDB opto-electric interface 1901 (to interface MDB 1603) as well as a device emulation library 1902 that is capable of direct MDB-level emulation of industry specific MDB attachable devices. As an example, element 1902 contains logic and state management capacity to directly emulate a physical coin acceptor device (or bill collector and the like) such that VMC 1609 recognizes logic 1902 as such and interacts with logic 1902 (e.g., directly in some embodiments or indirectly via direct VMC interface module 1612 in other embodiments) as if module 1610 were a true physical coin acceptor device. In this manner, logic 1902 is able to simulate the presence of a variety of physical devices as is required to fully automate the function of the vending machine 1601 under the control of mobile application 104.

Figure 20:
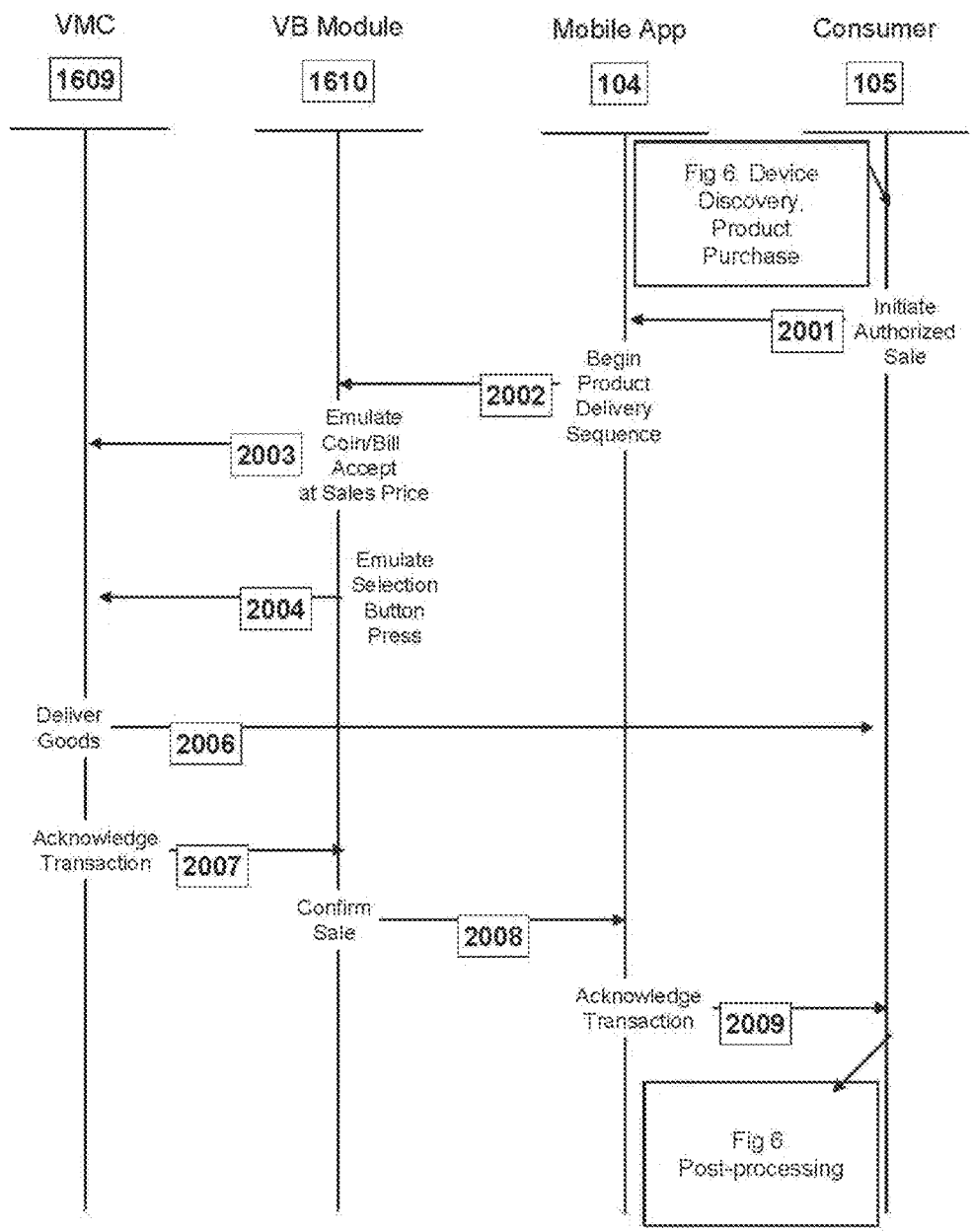
FIG. 20 includes a process of operation for a "retrofit module" in an embodiment of the invention.

FIG. 20 includes a process of operation for a "retrofit module" in an embodiment of the invention. For example, FIG. 20 includes an embodiment of a sequence of events for a retrofit module in a traditional VM such as the retro-fitted VM 1602. With retro-fit module 1610 the conventional VMC 1609 requires no change of configuration to support this retrofit mode of operation. Module 1610 provides a simulated and/or emulated native environment such that VMC 1609 operates as normal (i.e., as it would with traditional VM components (e.g., coin acceptor, bill acceptor, and the like) coupled thereto. The operations of FIG. 20 begin with device discovery (e.g., FIG. 8), communications session establishment (e.g., FIG. 7), product presentation (e.g., FIG. 6), product selection (e.g., FIG. 6), and payment authorization (e.g., FIG. 6).

However, some differences do exist between the operation of vending device 103 and the operation of a retrofitted VM using module 1610 (i.e., system 1602 has differences in terms of operation from device 104). For example, some differences lie in the interaction with a traditional MDB-based VM (e.g., VM 1601) that has been refitted with module 1610 (e.g., rendering VM 1602). As shown in FIG. 20, consumer 105 initiates an authorized sale (element 2001) according to previously described series of events (e.g., FIGS. 6-8). Mobile application 104 instructs module 1610 to dispense a product (element 2002). At this point, module 1610 begins a MDB emulation (element 2003) of a series of standard devices (e.g., elements 1604, 1605, 1606) such that VMC 1609 "sees" a standard VM sequence known to those of ordinary skill in the art. In this example, element 1902 emulates the protocol and state of a traditional coin acceptor 1604 that has been presented with enough currency to fulfill a sale. Other devices such as bill acceptors 1605, cashless devices 1606, RFID token 1607 and/or closed-loop vending devices and the like may be emulated in the same manner. Module 1902 implants a peripheral state and/or status (e.g., state and/or status of emulated device 1604) into VMC 1609 such that VMC 1609 enables the actuation of product dispensers that will in turn deliver a vended product. This actuation may be performed by MDB emulation as shown in element 2003 or, for example, it may be an additional emulation that simulates the pressing of a physical button such that VMC 1609 senses a normal product selection event. In either case, the combination of the emulation of currency acceptance and the simulation of pressing of a selection button enables VMC 1609 (or an equivalent controller/processor) (element 2004) to actuate the physical device(s) (e.g., servo motors, locking mechanisms, and the like) that are native to the VM (e.g., element 1604) and product is dispensed (element 2006) to consumer 105. Conventional VMC 1609 may communicate successful product dispensing (element 2007) back to module 1610, which relays or otherwise indicates success (element 2008) to application 104. Application 104 acknowledges the transaction to consumer 105 (element 2009) and then proceeds to the normal post-sale processing as described in FIG. 6. After completion, all devices enter default state.

An embodiment of the invention includes a vending system comprising a proximity detection module, a wireless communications module, a MDB interface, a device emulation module, and at least one storage medium having instructions stored thereon for causing the system to communicate MDB-level emulation of a state of at least one of a physical coin acceptor device, a bill acceptor, and RFID reader to a VMC.

Thus, various embodiments are described herein and those embodiments provide various advantages.

An embodiment includes a distributed network of Vending/Point of Sales machines consisting of a simple VM containing minimal control logic where some or all business intelligence (e.g., inventory management, sales recording, monetary processing and change/refund) are not present in the VM.

An embodiment includes a distributed network of Vending/Point of Sales machines consisting of a simple VM containing a control system where the non-intelligent VM is under the direct control of a mobile computing node application as well as an internet resident server application.

An embodiment includes a distributed network of Vending/Point of Sales machines consisting of a simple VM with no local user interface.

An embodiment includes a distributed network of Vending/Point of Sales machines consisting of a simple VM containing a vending system where all user interaction and experience takes place through UI elements contained within the mobile computing node application.

An embodiment includes a distributed network of Vending/Point of Sales machines consisting of a simple VM where machine sales and product inventory control are not managed locally and autonomously by the machine. Instead, all machine aspects are controlled by the combination of a mobile computing node application and a cloud-based server application.

An embodiment includes a distributed network of Vending/Point of Sales machines consisting of a simple VM containing no additional communications systems beyond a single a BLE communications function used in both secure and insecure modes to communicate with the mobile computing node application.

An embodiment includes a distributed network of Vending/Point of Sales machines consisting of a simple VM that uses the 3G/4G/Wi-Fi data connection of the computing node (e.g., Smartphone) to transport all machine and application related information and alerts.

An embodiment includes a distributed network of Vending/Point of Sales machines incorporating the queuing of a variety of collected information by a remote point of sales terminal in anticipation of the proximity of a cooperating mobile computing node application whereby proximity is detected and the queued information is relayed from a remote PoS to the computing node and then from the computing node to an internet resident data collection service.

An embodiment includes a distributed network of Vending/Point of Sales machines incorporating the queuing of information by a central application or service intended for delivery to an unconnected remote PoS device in anticipation of the proximity with a cooperating mobile computing node application whereby proximity is detected and the information is relayed from the central service to the mobile computing node and then from the mobile computing node to the remote PoS device.

An embodiment includes a distributed network of Vending/Point of Sales machines incorporating an online payment system under the control of the computing node (e.g., Smartphone) application to authorize and reconcile sales.

An embodiment includes a distributed network of Vending/Point of Sales machines incorporating a cloud based server maintaining all sales, inventory, alert, exception information for both individual machines as the aggregated network.

An embodiment includes a distributed network of Vending/Point of Sales machines incorporating an interactive console displaying status and condition of all business and network operations related information.

An embodiment includes a distributed network of Vending/Point of Sales machines where direct brand to user marketing is facilitated during the sales transaction via the combination and coordination of user profile, location, preference, and the like.

An embodiment includes a distributed network of Vending/Point of Sales machines incorporating a system conversion of virtual goods into physical goods by allowing for delivery of physical goods based upon proximity to the nearest VM or other preferable criteria related to a remote delivery terminal.

An embodiment includes a distributed network of Vending/Point of Sales machines where an individual may make a gift to another individual regardless of the physical locations of each. The gift giver may utilize a mobile application in concert with an enabled PoS terminal or the giver may use a standard web accessible application. The gift receiver will use the smart phone application and based upon nearest proximity or some other preferable criteria, will be guided to a device that provides the gift in a remote location.

An embodiment includes a distributed network of Vending/Point of Sales machines incorporating a system allowing for "gamification" of vending where physical goods are "won" during the course of a defined and programmed user activity. This system may be an augmentation to existing computing node (e.g., Smartphone) games and applications as a system of reward for gameplay or other desired user behavior.

An embodiment includes a distributed network of Vending/Point of Sales machines incorporating a system where a traditional VM comprised of a VMC, an MDB peripheral bus, and traditional currency acceptors may be retro-fitted with the wireless sales and product offering system described herein.

Embodiments (e.g., elements 103, 104, 102) discussed herein may utilize a system such as the system of FIG. 17, discussed below. In fact, embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as (a) a computer program product that may include one or more machine readable media having stored thereon instructions that may be used to program a processing system or other electronic device to perform the methods or (b) at least one storage medium having instructions stored thereon for causing a system to perform the methods. The term "machine readable medium" or "storage medium" used herein shall include any medium that is capable of storing or encoding a sequence of instructions (transitory media, including signals, or non-transitory media) for execution by the machine and that cause the machine to perform any one of the methods described herein. The term "machine readable medium" or "storage medium" shall accordingly include, but not be limited to, memories such as solid-state memories, optical and magnetic disks, read-only memory (ROM), programmable ROM (PROM), erasable PROM (EPROM), electrically EPROM (EEPROM), a disk drive, a floppy disk, a compact disk ROM (CD-ROM), a digital versatile disk (DVD), flash memory, a magneto-optical disk, as well as more exotic mediums such as machine-accessible biological state preserving or signal preserving storage. A medium may include any mechanism for storing, transmitting, or receiving information in a form readable by a machine, and the medium may include a medium through which the program code may pass, such as antennas, optical fibers, communications interfaces, and the like. Program code may be transmitted in the form of packets, serial data, parallel data, and the like, and may be used in a compressed or encrypted format. Furthermore, it is common in the art to speak of software, in one form or another (e.g., program, procedure, process, application, module, logic, and so on) as taking an action or causing a result. Such expressions are merely a shorthand way of stating that the execution of the software by a processing system causes the processor to perform an action or produce a result.

Figure 17:
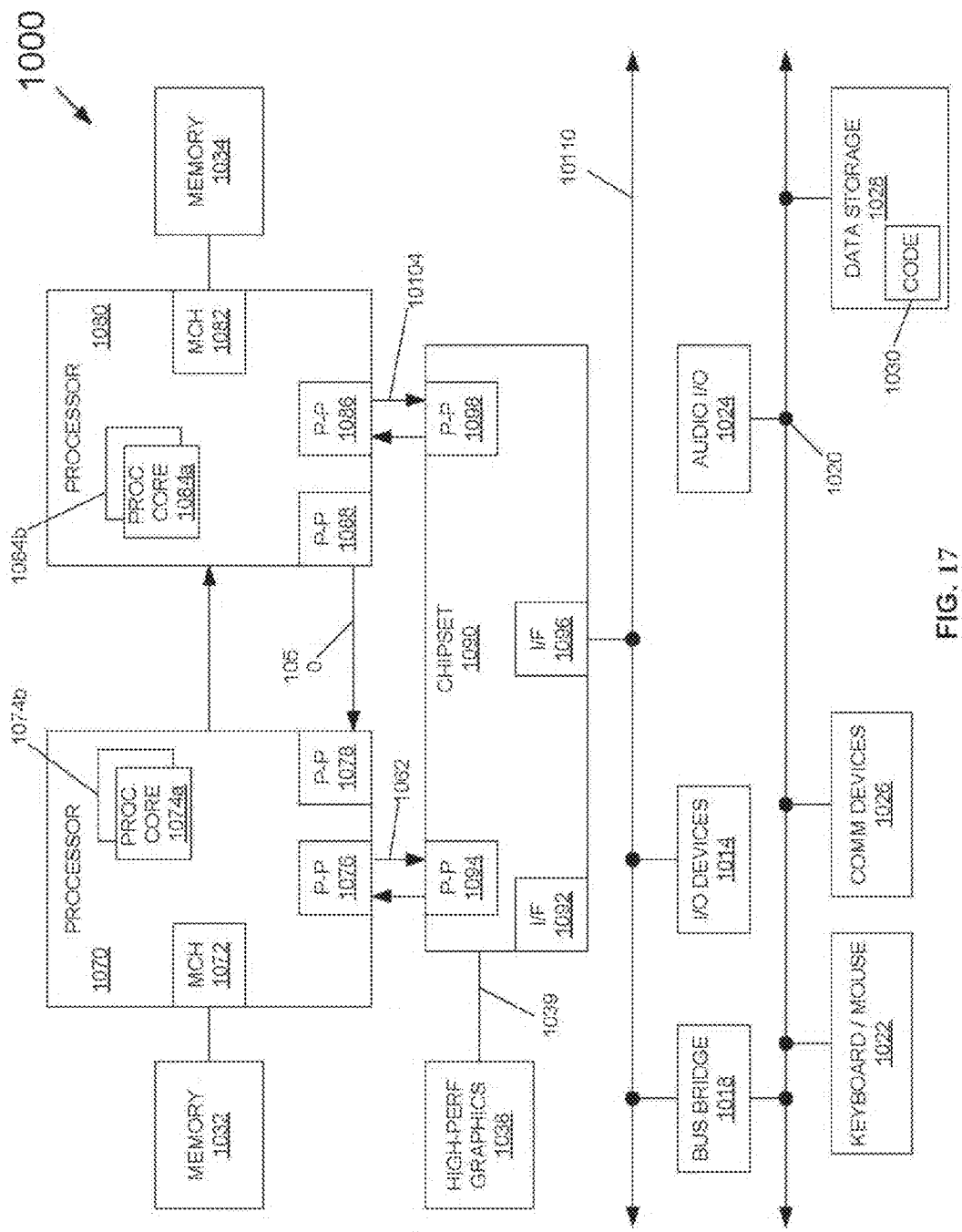
FIG. 17 includes a system for use with an embodiment of the invention.

Referring now to FIG. 17, shown is a block diagram of a system embodiment 1000 in accordance with an embodiment of the present invention. System 1000 may be included in, for example, a computing node such as a cellular phone, Smartphone, tablet, Ultrabook®, notebook, laptop, personal digital assistant, and mobile processor based platform.

Shown is a multiprocessor system 1000 that includes a first processing element 1070 and a second processing element 1080. While two processing elements 1070 and 1080 are shown, it is to be understood that an embodiment of system 1000 may also include only one such processing element. System 1000 is illustrated as a point-to-point interconnect system, wherein the first processing element 1070 and second processing element 1080 are coupled via a point-to-point interconnect 1050. It should be understood that any or all of the interconnects illustrated may be implemented as a multi-drop bus rather than point-to-point interconnect. As shown, each of processing elements 1070 and 1080 may be multicore processors, including first and second processor cores (i.e., processor cores 1074a and 1074b and processor cores 1084a and 1084b). Such cores 1074, 1074b, 1084a, 1084b may be configured to execute instruction code in a manner similar to methods discussed herein.

Each processing element 1070, 1080 may include at least one shared cache. The shared cache may store data (e.g., instructions) that are utilized by one or more components of the processor, such as the cores 1074a, 1074b and 1084a, 1084b, respectively. For example, the shared cache may locally cache data stored in a memory 1032, 1034 for faster access by components of the processor. In one or more embodiments, the shared cache may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the present invention is not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, microarchitectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

First processing element 1070 may further include memory controller logic (MC) 1072 and point-to-point (P-P) interfaces 1076 and 1078. Similarly, second processing element 1080 may include a MC 1082 and P-P interfaces 1086 and 1088. MC's 1072 and 1082 couple the processors to respective memories, namely a memory 1032 and a memory 1034, which may be portions of main memory locally attached to the respective processors. While MC logic 1072 and 1082 is illustrated as integrated into the processing elements 1070, 1080, for alternative embodiments the MC logic may be discreet logic outside the processing elements 1070, 1080 rather than integrated therein.

First processing element 1070 and second processing element 1080 may be coupled to an I/O subsystem 1090 via P-P interfaces 1076, 1086 via P-P interconnects 1062, 10104, respectively. As shown, I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, a bus may be used to couple graphics engine 1038 to I/O subsystem 1090. Alternately, a point-to-point interconnect 1039 may couple these components.

In turn, I/O subsystem 1090 may be coupled to a first bus 10110 via an interface 1096. In one embodiment, first bus 10110 may be a Peripheral Component Interconnect (PCI) bus, or a bus such as a PCI Express bus or another third generation I/O interconnect bus, although the scope of the present invention is not so limited.

As shown, various I/O devices 1014, 1024 may be coupled to first bus 10110, along with a bus bridge 1018 which may couple first bus 10110 to a second bus 1020. In one embodiment, second bus 1020 may be a low pin count (LPC) bus. Various devices may be coupled to second bus 1020 including, for example, a keyboard/mouse 1022, communication device(s) 1026 (which may in turn be in communication with a computer network), and a data storage unit 1028 such as a disk drive or other mass storage device which may include code 1030, in one embodiment. The code 1030 may include instructions for performing embodiments of one or more of the methods described above. Further, an audio I/O 1024 may be coupled to second bus 1020.

Note that other embodiments are contemplated. For example, instead of the point-to-point architecture shown, a system may implement a multi-drop bus or another such communication topology. Also, the elements of FIG. 17 may alternatively be partitioned using more or fewer integrated chips than shown in the FIG. 17.

A module as used herein refers to any hardware, software, firmware, or a combination thereof. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices. However, in another embodiment, logic also includes software or code integrated with hardware, such as firmware or micro-code.

An embodiment includes a product purchase protocol. In such a protocol vending device 103 performs the following: 1) Beacon detects nearby potential customer, 4) BLE—Mobile Device connection enabled, 5) Vending box 103 Sends Seed, 20) Vending box 103 receives Key, 21) Vending box 103 deciphers Key and confirms if applicable, 22) Vending box 103 drops purchased products, 23) Sensor confirms product was delivered, 24) Vending box 103 sends successful delivery confirmation. In such a protocol mobile application 104 performs the following: 2) Beacon triggers a welcome screen (this element (2) would take place after element (1) immediately above and before element (3) immediately below and so on for the description of this embodiment), 3) Customer accepts invitation (triggers connect sequence), 6) Sends seed number to vending server 102 as well as customer identity, 9) Mobile device/application 104 receives and displays product availability and prices, 10) User selects product to purchase and quantity, 12) User selects payment method (Vending box 103 Rewards, PayPal, etc.), 13) User logs in to payment method and approves purchase, 18) Mobile Device application 104 receives Key, 19) Mobile Device application sends Key to Vending box 103, 25) Mobile Device receives successful delivery confirmation and notifies vending server 102. In such a protocol payment service 101 performs the following: 14) server 102 charges customer through PayPal (or equivalent) API. In such a protocol server 102 performs the following: 7) server 102 receives Seed Number from Vending box 103, 8) sends that Vending box's product availability and prices, 11) receives product selection and quantity from Mobile Device, 15) gets confirmation of transaction, 16) generates product drop key using the Seed Number as input and including product selection and quantity, 17) sends Mobile Device application 104 the temporal Key, 26) receives successful delivery confirmation and logs the transaction, 27) decides whether to ask client for feedback.

An embodiment includes an incident reporting protocol. In such a protocol vending device 103 performs the following: 1) Vending box 103 detects incident (power out, accelerometer triggered, etc.), 2) Event gets flagged and timer starts counting, 3) Beacon will notify passing by clients about incident and opportunity to report, 6) Vending box 103 sends Flags information (time, event, # of missed sales and the like, all of which may be formatted in DEX appropriate formatting) to Mobile Device application 104. In such a protocol mobile application 104 performs the following: 4) Passing by client gets notified vending machine wants to report information (this element (4) would take place after element (3) immediately above and before element (5) immediately below and so on for the description of this embodiment), 5) Client decides to report, 7) receives Flags information, 8) sends information along with Client Identity to the VB Cloud, 13) displays granted reward. In such a protocol server 102 performs the following: 9) receives incident information, 10) choose to reward the report, 11) rewards the client and logs the reward, 12) VB cloud notifies the Mobile Device about the granted reward. In such a protocol operator 100 performs the following: 14) server 102 immediately notifies Vending Operator 100 about incident.

An embodiment includes a product price change protocol. In such a protocol vending application 104 performs the following: 5) inquires product availability and price list for a specific Vending box 103, 7) receives updated product availability and price list. In such a protocol server 102 performs the following: 3) receive change request, 4) update price list or product availability for that Unique ID, 6) send updated product availability and price list. In such a protocol vending operator 10 performs the following: 1) decides to change product pricing or availability, 2) sends request to server 102 with new prices/availability and Vending box 103 Unique ID. The numbers (e.g., 1) and 2) and the like should be interpreted as indicating a temporal order for execution of actions.

An embodiment includes a vending operator request protocol. In such a protocol vending operator 100 performs the following: 1) Vending box 103 notifies server 102 about a specific request (for example, they want to know where a vending machine is located), 10) Vending box operator 100 gets notified with the latest Vending box 103 coordinates. In such a protocol server 102 performs the following: 2) receives request and creates a flag associated with a unique id, 5) receives inquiry and finds out the Vending box 103 is flagged, 6) sends customer an opportunity to participate along with product availability and prices if applicable, 9) receives coordinates information, logs it and notifies Vending box 103 operator, 11) chose to reward customer, 12) logs the reward and notifies customer. In such a protocol application 104 performs the following: 3) gets invited through beacons to make a purchase, 4) sends the unique ID along with the customer ID to the VB cloud to inquire product availability and prices, 7) Customer chooses to participate and report current coordinates, 8) Customer tags current Vending box 103 coordinates using location services and sends that information to the VB cloud, 13) Customer receives notification of the reward received. The numbers (e.g., 1) and 2) and the like should be interpreted as indicating a temporal order for execution of actions.

Example 1a includes a system comprising a first vending machine (VM), the first VM comprising: an exterior chassis having a top, bottom, backside, front side, and first and second sides that couple the front side to the backside; a wireless short range communications node included in the chassis; and an actuator coupled to a compartment included in the chassis; wherein (a) the actuator provides a vended good to an aperture in the front side upon actuation, and (b) each of the front side and first and second sides includes no physically manipulatable consumer interface with which the consumer can control the first VM via direct physical manipulation of the first VM.

In an example the chassis may resemble a mere box without the traditional physical consumer interface (e.g., buttons to select a soda, a currency collector, a touchscreen, and the like) cluttering the front side of the vending box. From the consumer's perspective the vending box may resemble a simple cooler in some embodiments; albeit one that produces a vended good or article via an aperture. Of course, the vended good need not be a soda or food article but may include post-mix offerings and the like. The actuator may provide a vended good (e.g., a cup in which a beverage is eventually dispensed) from an interior compartment to the aperture.

In example 2a the subject matter of Example 1a can optionally include wherein each of the front side and first and second sides includes no electronic display and the first VM includes none of the group comprising a multi-drop bus (MDB), a coin collector, and a magnetic card reader.

Thus, an embodiment provides a VM wherein much of the traditional intelligence/logic included in a traditional VM (along with the corresponding costs) are now more efficiently distributed across a mobile computing node and cloud based computing node. Such an embodiment is also more energy efficient considering the lack of power drawing elements such as electronic displays.

In example 3a the subject matter of Examples 1a-2a can optionally include wherein each of the front side and first and second sides including no physically manipulatable consumer interface with which the consumer can control the first VM via direct physical manipulation of the first VM includes each of the front side and first and second sides including no physical buttons nor interactive electronic display with which the consumer can control the first VM via direct physical manipulation of the first VM.

Examples of a "physically manipulatable consumer interface with which the consumer can control the first VM via direct physical manipulation of the first VM" include a touchscreen or mechanical buttons whereby a user selects a product that, after payment, is delivered to the user. An embodiment is a simple a unit that merely discovers a mobile computing node and possibly allows for key exchange between the mobile node and a VM but which still does not amount to a UI whereby a user "can control the first VM via direct physical manipulation of the first VM".

In example 4a the subject matter of Examples 1a-3a can optionally include a second VM; and at least one remote computing node comprising at least one machine readable medium storing first inventory data corresponding to the first VM and second inventory data corresponding to the second VM; wherein neither of the first and second VMs include memory storing inventory data related to either of the first and second inventory data.

For example, an embodiment of a VM may forego memory and related equipment for tracking its inventory considering that can now be handled by, for example, a cloud based server or other such computing node.

In example 5a the subject matter of Examples 1a-4a can optionally include wherein the at least one remote computing node comprises at least one machine readable medium having instructions stored thereon for causing the at least one remote computing node to: communicate with at least one mobile computing node; store first and second data respectively corresponding to the first and second VMs; communicate the first and second data respectively to the first and second VMs, via the at least one mobile computing node, in response to communicating with the at least one mobile computing node.

For example, a server node may include a queue having updated advertising programming for a display (but not a UI) on the VM that merely displays advertising. The advertising programming may be included in the first and second data. This data may be conveyed to the VMs via a Smartphone over a period of time. For example, on a Monday the first data could be transferred from on Smartphone to the first VM and on a Wednesday the second data could be transferred from a different Smartphone to the second VM.

In example 6a the subject matter of Examples 1a-5a can optionally include wherein the first VM includes at least one machine readable medium having instructions stored thereon for causing the first VM to discover at least one mobile computing node and communicate with the at least one mobile computing node; wherein the at least one remote computing node comprises at least one storage medium having instructions stored thereon for causing the at least one remote computing node to communicate an actuation command to the first VM, via the at least one mobile computing node, to actuate the actuator to provide the vended good to the aperture.

In example 7a the subject matter of Examples 1a-6a can optionally include wherein the at least one remote computing node comprises at least one storage medium having instructions stored thereon for causing the at least one remote computing node to: establish a first communication session with at least one mobile computing node; and communicate the first and second inventory data to the at least one computing node in response to establishing the first communication session and before the first communication session ends.

In an example a user may receive first and second inventory data for first and second VMs with which the user's Smartphone has been discovered. The user may then flip or slide the UI on his Smartphone from one listing of inventor for the first VM to another listing for a second VM so the user can quickly see his total number of options.

Figure 18:
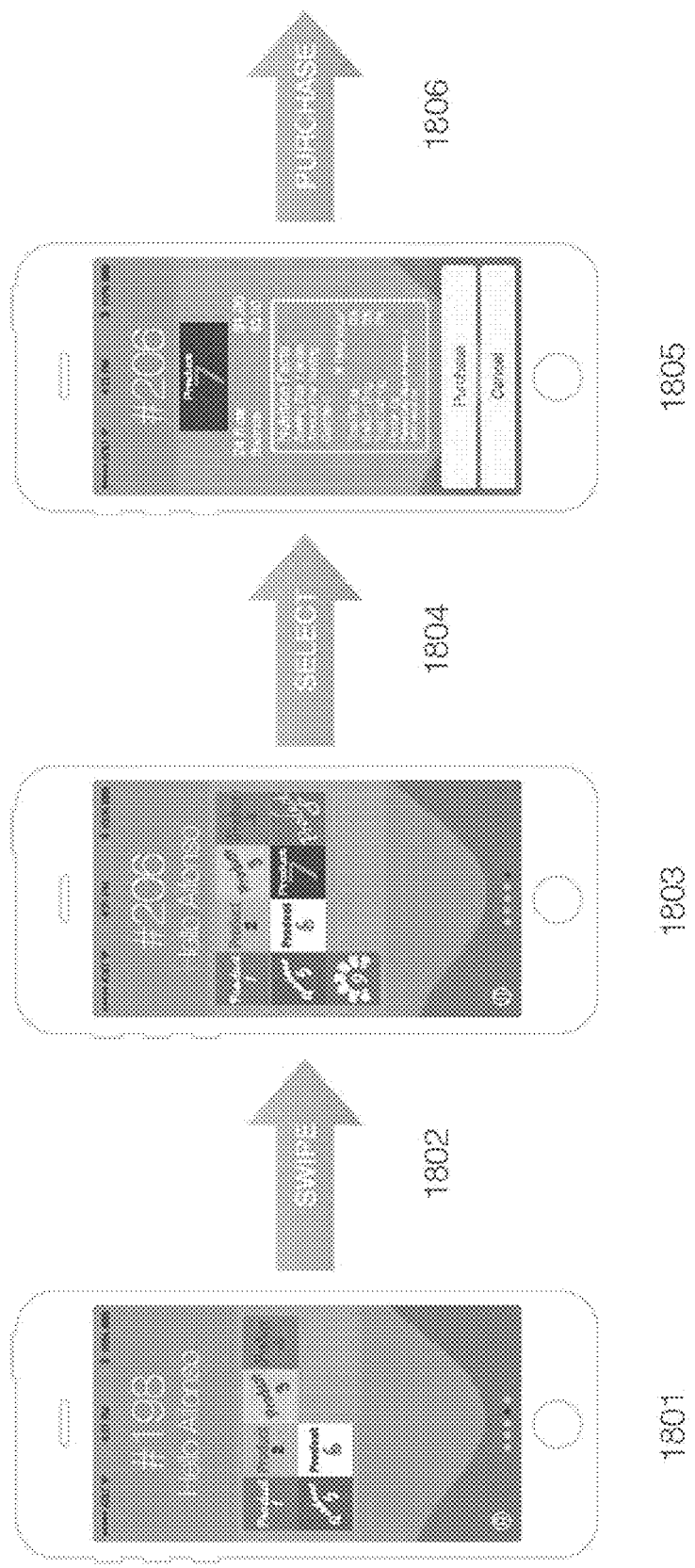
FIG. 18 includes an embodiment of a UI and a process for viewing inventory of disparate VMs.

FIG. 18 includes an embodiment of a UI and a process for viewing inventory of disparate VMs. At element 1801 BLE detects nearby VMs and gets their respective information from server 102. The UI of element 1801 is for VM #198 and it is one out of 5 machines nearby as the reference dots in the bottom part of the screen show. At element 1802, the user may want a product not listed for VM #198 so the user "swipes" to the next VM (that has been discovered) to see what products are available. At element 1803 VM #206 appears with its current product availability. There are more products to choose from and the user is now interested in purchasing "product 7", which could be a soda, coffee, article of clothing, electronic device, QR code with encoded value, and the like. At element 1804, when the user clicks on the product, a private connection from the user's mobile node to machine #206 is enabled through BLE. At element 1805 information on the selected product is downloaded from the server 102 and displayed on the user's device along with price and the user's current balance in an account tied to the vending operator 100. At element 1806 the user chooses to purchase the product or cancel and go back to the previous screen. The user chooses to pay with his current balance or with a payment account like PayPal®. After the transaction, the product is provided to the consumer.

In example 8a the subject matter of Examples 1a-7a can optionally include wherein the first VM includes at least one machine readable medium having instructions stored thereon for causing the first VM to establish a first communication session with at least one mobile computing node and later terminate the first communication session; wherein the second VM includes at least one machine readable medium having instructions stored thereon for causing the second VM to establish a second communication session with the at least one mobile computing node and later terminate the second communication session; wherein at least a portion of the first and second communication sessions overlap one another.

In an embodiment the first and second VMs can simultaneously be in Device Discovered mode by a single mobile node.

In example 9a the subject matter of Examples 1a-8a can optionally include wherein the at least one remote computing node comprises at least one storage medium having instructions stored thereon for causing the at least one remote computing node to: establish a first communication session with at least one mobile computing node; communicate the first and second inventory data to the at least one computing node in response to establishing the first communication session and before the first communication session ends; and in response to a user initiated selection of a product included in the first inventory data, providing directions to the user regarding a physical location of the first VM; wherein the user initiated selection is communicated from the at least one mobile computing node.

In an embodiment a user may choose a product from one VM but not another and then get instructions on how to get to the VM having the product she or he desires.

In example 10a the subject matter of Examples 1a-9a can optionally include at least one remote computing node including at least one storage medium having instructions stored thereon for causing the at least one remote computing node to: communicate with a first mobile computing node to determine the first mobile computing node desires to purchase a credit for a second computing node; award the credit to the second computing node in response to communicating with the first mobile computing node to determine the first mobile computing node desires to purchase a credit for a second computing node; communicate with the second mobile computing node to indicate the credit was awarded to the second computing node; and communicate an actuation command to the first VM, via the second mobile computing node, based on the credit being awarded to the second computing node.

In an embodiment a user, such as a child's parent using the parent's Smartphone, can gift a credit to a child at school. The child's Smartphone may be credited and the child may then obtain a vended product.

In example 11b the subject matter of Examples 1a-10a can optionally include wherein the credit corresponds to a first product included in inventory of the first VM but not a second product included in inventory of the first VM. Thus, the child's parent can target the credit towards, for example, a first product having lower sugar content than that of the second product.

In example 11c the subject matter of Examples 1a-10a can optionally include a second VM, wherein the credit corresponds to the first VM, but not the second VM, and is redeemable at the first VM but not the second VM. Thus, the gift may direct the recipient to a VM that is infrequently used in hopes of generating new business at the location of the VM. For example, the user may typically frequent the second VM (which the vending operator has a difficult time keeping fully stocked or which the vending operator may have to pay a higher commission to a landlord for) and the operator may wish to redirect the user to the first VM. The gifter may be able to select from a listing of VMs that is posted on the internet. The gift may include keying material specific to an ID of the first VM (e.g., encrypted with a public key that corresponds to the private key of the first VM) but not the second VM thereby limiting the award to usefulness with the first VM.

In example 11a the subject matter of Examples 1a-10a can optionally include at least one remote computing node at least one storage medium having instructions stored thereon for causing the at least one remote computing node to: communicate with at least one of an additional remote computing node and a first mobile computing node to determine the first mobile computing node should be awarded a credit in response to a user having been awarded a prize in a game; award the credit to the first mobile computing node in response to communicating with at least one of the additional remote computing node and the first mobile computing node; communicate with the first mobile computing node to indicate the credit was awarded to the first computing node; and communicate an actuation command to the first VM, via the first mobile computing node, based on the credit being awarded to the first computing node.

In an embodiment the award may be redeemable at a specific VM. The VM may be located at a certain location. For example, a grocery store chain may sponsor the award of the gift/credit obtained through playing the game. The grocery store chain may have a particular store or stores that have VMs with unique ids, all of which will receive the award (which may include keying material only compatible with the keys on the designated VMs). This may incentivize the user to enter one of the grocer's locations.

In example 12a the subject matter of Examples 1a-11a can optionally include wherein the first VM is included in a storefront wall and the aperture is exposed directly to an area outside a store that includes the storefront wall.

An embodiment according to this example would allow a storefront on a busy street to still vend products late into the evening for "window shoppers". For example, considering the simplicity and low cost nature of many vending box solutions described herein, a merchant could include a series of the vending boxes in his or her storefront wall (e.g., wall being made of bricks, glass (i.e., window), and the like). Each vending box may have a single compartment with a single lock that the actuator of the VM actuates to unlock the lock and provide the consumer with a product.

As another example, a coffee house may receive orders in advance for coffees made to order. Such an order may come from an office worker that works several blocks from the coffee house. The worker may submit his order (e.g., possibly over the internet or by voice) and then begin his transit to the coffee house. The coffee house may make the coffee during his transit and place the coffee in a vending box that corresponds with a receipt and credit the office worker has on his phone (received from a cloud based node as described above). The office worker's Smartphone, watch, glasses, and the like may then discover the appropriate vending box, open the vending box using an actuation command received from the server, obtain his coffee, all without entering the congested coffee house and dealing with long waits for coffee. Of course the vending box need not be in the storefront wall for all embodiments.

In example 13a the subject matter of Examples 1a-12a can optionally include at least one remote computing node comprising at least one machine readable medium storing first inventory data corresponding to one or more products available via the first VM; wherein the first VM includes at least one machine readable medium having instructions stored thereon for causing the first VM to discover at least one mobile computing node and communicate with the at least one mobile computing node; wherein the at least one remote computing node comprises at least one storage medium having instructions stored thereon for causing the at least one remote computing node to: (a) receive a selection communication, corresponding to a user's selection of the one or more products, from the at least one mobile computing node, and (b) in response to receiving the selection communication, communicate an actuation command to the first VM, via the at least one mobile computing node, to actuate the actuator to deliver the vended good to the aperture.

In example 14a the subject matter of Examples 1a-13a can optionally include wherein the at least one remote computing node comprises at least one storage medium having instructions stored thereon for causing the at least one remote computing node to communicate an order corresponding to a user's selection of the one or more products to an additional computing node via a non-wireless short range communication.

In an embodiment the order may be sent via the internet to a node in, for example, a coffee shop such that coffee shop vendor can begin preparing the coffee before any discovery takes place between a user's mobile computing node and a vending box.

In example 15a the subject matter of Examples 13a-14a can optionally include wherein the wireless short range communications node is configured for at least one of Bluetooth and near field communications (NFC) and the at least one remote computing node comprises a server.

Example 1b includes at least one storage medium having instructions stored thereon for causing a first mobile computing node to: communicate with at least one remote computing node to indicate the first mobile computing node desires to purchase a first credit for a second computing node; receive a second credit from at least one of the second computing node and a third computing node in response to the at least one of the second computing node and a third computing node communicating with the at least one remote computing node to indicate the at least one of the second computing node and a third computing node desired to purchase the second credit for the first mobile computing node; receive a communication from the at least one remote computing node indicating the second credit was awarded to the first mobile computing node; and communicate an actuation command to a first vending machine (VM) based on the second credit. Such a first mobile computing node may include, for example, the node including application 104.

In example 2b the subject matter of Example 1b can optionally include wherein the second credit corresponds to a first product included in inventory of the first VM but not a second product included in inventory of the first VM.

In example 3b the subject matter of Examples 1b-2b can optionally include wherein the second credit corresponds to the first VM, but not a second VM, and is redeemable at the first VM but not the second VM.

In example 4b the subject matter of Examples 1b-3b can optionally include instructions to cause the first mobile computing node to: establish a first communication session with the at least one remote computing node; and receive first and second inventory data, corresponding to the first VM and a second VM, from the at least one remote computing node in response to establishing the first communication session and before the first communication session ends.

In example 5b the subject matter of Examples 1b-3b can optionally include instructions to cause the first mobile computing node to: establish a first communication session with the at least one remote computing node; and receive first and second inventory data, corresponding to the first VM and a second VM, from the at least one remote computing node in response to establishing the first communication session and before the first communication session ends; communicate a user initiated selection of a product included in the first inventory data to the at least one remote computing node; and receive directions regarding a physical location of the first VM, but not the second VM, in response to communicating the user initiated selection to the at least one remote computing node.

Example 1c includes a vending system comprising: a proximity detection module to detect proximity of a mobile computing node within 100 meters of the vending system; a wireless communications module to wirelessly communicate with the mobile computing node; a device emulation module; a multi-drop bus (MDB) interface to couple the device emulation module to a MDB; and at least one storage medium having instructions stored thereon for causing the system to communicate a first emulation of a first peripheral state to a vending machine controller (VMC); wherein the first peripheral state corresponds to a state of at least one of a physical coin acceptor device, a bill acceptor, a credit card reader, a near field communication (NFC) reader, and a radiofrequency identification (RFID) reader. In other embodiments the proximity detection module detects proximity of a mobile computing node within 1 cm, 1 m, 10 m, 50 m, 100 m, 250 m, 400 m, 500 m and the like. Other embodiments are not limited to a MDB and may cooperate with other bus systems. Other embodiments are not limited to a VMC and may cooperate with other controller systems. In an embodiment the first peripheral state corresponds to a state of at various forms of systems that convey financial information to a VM (e.g., cashless payment systems) and is not limited to a physical coin acceptor device, a bill acceptor, a credit card reader, a near field communication (NFC) reader, and a radiofrequency identification (RFID) reader.

In example 2c the subject matter of Example 1c and can optionally include wherein the at least one medium comprises instructions to cause the system to: receive a first actuation instruction from the mobile computing node; and in response to receiving the first actuation instruction, communicate a second actuation instruction to the VMC; wherein the first actuation instruction corresponds to an authorization of a sale of a product, and the second actuation instruction is configured to cause the VMC to issue a third actuation instruction to vend the product from a vending machine, coupled to the vending system, to a user; wherein the third actuation instruction enables mechanical actuation of a product dispenser to actuate a mechanical system to communicate the product to the user. In an embodiment the "first actuation instruction" is not to be construed as to indicate the first actuation instruction necessarily requires a direct actuation command but may instead include indirection actuation such as a general approval instruction that begets a series of instructions, one of which eventually actuates a system (e.g., a lock or gear) to operate and vend a product. The same is true for the "second" and "third" actuation commands, however in some embodiments some or all of the first, second, and third actuation commands does include a direct actuation command.

In example 3c the subject matter of Examples 1c-2c can optionally include wherein (a) the second actuation instruction corresponds to an instruction formatted for the VMC and indicating a threshold level of credit exists to vend the product, and (c) the mechanical system includes at least one of a mechanical lock and a servo motor. By "formatted for the VMC" this may entail, in an embodiment, compliance with an adopted standard or specification for communication with the VMC. The "threshold level of credit" may indicate a sufficient amount of coins or bills or credit (via a credit card or PayPal®) has been received.

An embodiment may include a remote node, such as a server 102. An embodiment may include a software as a service (SAAS).

Example 1d includes at least one machine readable medium having instructions stored thereon for causing at least one remote computing node to: communicate with at least one mobile computing node; store first and second data respectively corresponding to a first vending machine (VM) and a second VM; communicate the first and second data respectively to the first and second VMs, via the at least one mobile computing node, in response to communicating with the at least one mobile computing node.

In example 2d the subject matter of Example 1d can optionally include the at least one machine readable medium having instructions stored thereon for causing at least one remote computing node to communicate an actuation command to the first VM, via the at least one mobile computing node, to actuate the actuator to provide the vended good to the aperture.

In example 3d the subject matter of Examples 1-2d can optionally include the at least one machine readable medium having instructions stored thereon for causing at least one remote computing node to: establish a first communication session with at least one mobile computing node; and communicate first and second inventory data, corresponding to the first and second VMs, to the at least one remote computing node in response to establishing the first communication session and before the first communication session ends.

In example 4d the subject matter of Examples 1-3d can optionally include the at least one machine readable medium having instructions stored thereon for causing at least one remote computing node to: establish a first communication session with at least one mobile computing node; communicate the first and second inventory data to the at least one computing node in response to establishing the first communication session and before the first communication session ends; and in response to a user initiated selection of a product included in first inventory data corresponding to the first VM, provide directions to the user regarding a physical location of the first VM; wherein the user initiated selection is communicated from the at least one mobile computing node.

Example 1e includes at least one machine readable medium having instructions stored thereon for causing at least one remote computing node to: communicate with a first mobile computing node to determine the first mobile computing node desires to purchase a credit for a second computing node; award the credit to the second computing node in response to communicating with the first mobile computing node to determine the first mobile computing node desires to purchase a credit for a second computing node; communicate with the second mobile computing node to indicate the credit was awarded to the second computing node; and communicate an actuation command to the first VM, via the second mobile computing node, based on the credit being awarded to the second computing node. In an example, the credit corresponds to a first product included in inventory of the first VM but not a second product included in inventory of the first VM. In an example the credit corresponds to the first VM, but not a second VM, and is redeemable at the first VM but not the second VM.

Example 1f includes at least one machine readable medium having instructions stored thereon for causing at least one remote computing node to: communicate with at least one of an additional remote computing node and a first mobile computing node to determine the first mobile computing node should be awarded a credit in response to a user having been awarded a prize in a game; award the credit to the first mobile computing node in response to communicating with at least one of the additional remote computing node and the first mobile computing node; communicate with the first mobile computing node to indicate the credit was awarded to the first computing node; and communicate an actuation command to the first VM, via the first mobile computing node, based on the credit being awarded to the first computing node.

Example 1g includes at least one machine readable medium having instructions stored thereon for causing at least one remote computing node to: store first inventory data corresponding to one or more products available via a first vending machine (VM); receive a selection communication, corresponding to a user's selection of the one or more products, from the at least one mobile computing node; and in response to receiving the selection communication, communicate an actuation command to the first VM, via the at least one mobile computing node, to actuate the actuator to deliver the vended good to the aperture. In an example the instructions may cause at least one remote computing node to communicate an order corresponding to a user's selection of the one or more products to an additional computing node via a non-wireless short range communication.

An additional example includes a system comprising a first vending machine (VM), the first VM comprising: an exterior chassis having a top, bottom, backside, front side, and first and second sides that couple the front side to the backside; a means for wireless short range communications included in the chassis; and an actuator means coupled to a compartment included in the chassis; wherein (a) the actuator means includes means for providing a vended good to an aperture in the front side upon actuation, and (b) each of the front side and first and second sides includes no physically manipulatable consumer interface with which the consumer can control the first VM via direct physical manipulation of the first VM.

The additional example may include wherein each of the front side and first and second sides includes no electronic display means and the first VM includes none of the group comprising a multi-drop bus (MDB), a coin collector, and a magnetic card reader.

The additional example may include wherein each of the front side and first and second sides including no physically manipulatable consumer interface with which the consumer can control the first VM via direct physical manipulation of the first VM includes each of the front side and first and second sides including no physical buttons nor interactive electronic display with which the consumer can control the first VM via direct physical manipulation of the first VM.

The additional example may include a second VM; and at least one remote computing node comprising means for storing first inventory data corresponding to the first VM and second inventory data corresponding to the second VM; wherein neither of the first and second VMs include means for storing inventory data related to either of the first and second inventory data.

The additional example may include wherein the at least one remote computing node comprises means for causing the at least one remote computing node to: communicate with at least one mobile computing node; store first and second data respectively corresponding to the first and second VMs; communicate the first and second data respectively to the first and second VMs, via the at least one mobile computing node, in response to communicating with the at least one mobile computing node.

The additional example may include wherein the first VM includes means for causing the first VM to discover at least one mobile computing node and communicate with the at least one mobile computing node; wherein the at least one remote computing node comprises means for causing the at least one remote computing node to communicate an actuation command to the first VM, via the at least one mobile computing node, to actuate the actuator to provide the vended good to the aperture.

The additional example may include wherein the at least one remote computing node comprises means for causing the at least one remote computing node to: establish a first communication session with at least one mobile computing node; and communicate the first and second inventory data to the at least one computing node in response to establishing the first communication session and before the first communication session ends.

The additional example may include wherein the first VM includes means for causing the first VM to establish a first communication session with at least one mobile computing node and later terminate the first communication session; wherein the second VM includes means for causing the second VM to establish a second communication session with at least one mobile computing node and later terminate the second communication session; wherein at least a portion of the first and second communication sessions overlap one another.

The additional example may include wherein the at least one remote computing node comprises means for causing the at least one remote computing node to: establish a first communication session with at least one mobile computing node; communicate the first and second inventory data to the at least one computing node in response to establishing the first communication session and before the first communication session ends; and in response to a user initiated selection of a product included in the first inventory data, provide directions to the user regarding a physical location of the first VM; wherein the user initiated selection is communicated from the at least one mobile computing node.

The additional example may include at least one remote computing node including means for causing the at least one remote computing node to: communicate with a first mobile computing node to determine the first mobile computing node desires to purchase a credit for a second computing node; award the credit to the second computing node in response to communicating with the first mobile computing node to determine the first mobile computing node desires to purchase a credit for a second computing node; communicate with the second mobile computing node to indicate the credit was awarded to the second computing node; and communicate an actuation command to the first VM, via the second mobile computing node, based on the credit being awarded to the second computing node.

The additional example may include wherein the credit corresponds to a first product included in inventory of the first VM but not a second product included in inventory of the first VM.

The additional example may include a second VM, wherein the credit corresponds to the first VM, but not the second VM, and is redeemable at the first VM but not the second VM.

The additional example may include at least one remote computing node including means for causing the at least one remote computing node to: communicate with at least one of an additional remote computing node and a first mobile computing node to determine the first mobile computing node should be awarded a credit in response to a user having been awarded a prize in a game; award the credit to the first mobile computing node in response to communicating with at least one of the additional remote computing node and the first mobile computing node; communicate with the first mobile computing node to indicate the credit was awarded to the first computing node; and communicate an actuation command to the first VM, via the first mobile computing node, based on the credit being awarded to the first computing node.

The additional example may include wherein the first VM is included in a storefront wall and the aperture is exposed directly to an area outside a store that includes the storefront wall.

The additional example may include at least one remote computing node comprising means for storing first inventory data corresponding to one or more products available via the first VM; wherein the first VM includes means for causing the first VM to discover at least one mobile computing node and communicate with the at least one mobile computing node; wherein the at least one remote computing node comprises means for causing the at least one remote computing node to: (a) receive a selection communication, corresponding to a user's selection of the one or more products, from the at least one mobile computing node, and (b) in response to receiving the selection communication, communicate an actuation command to the first VM, via the at least one mobile computing node, to actuate the actuator to deliver the vended good to the aperture.

The additional example may include wherein the at least one remote computing node comprises means for causing the at least one remote computing node to communicate an order corresponding to a user's selection of the one or more products to an additional computing node via a non-wireless short range communication.

The additional example may include wherein the wireless short range communications node is configured for at least one of Bluetooth and near field communications (NFC) and the at least one remote computing node comprises a server.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system comprising:
a first vending machine (VM) comprising:
an exterior chassis having a top, bottom, backside, front side, and first and second sides that couple the front side to the backside;
a wireless short range communications node included in the chassis; and
an actuator coupled to a compartment included in the chassis;
a second VM; and
at least one remote computing node comprising at least one machine readable medium storing first inventory data corresponding to the first VM and second inventory data corresponding to the second VM;
wherein (a) the actuator provides a vended good to an aperture in the front side upon actuation, (b) each of the front side and first and second sides includes no physically manipulatable consumer interface with which the consumer can control the first VM via direct physical manipulation of the first VM, and (c) neither of the first and second VMs include memory storing inventory data related to either of the first and second inventory data.

2. The system of claim 1, wherein the at least one remote computing node comprises at least one machine readable medium having instructions stored thereon for causing the at least one remote computing node to:
communicate with at least one mobile computing node;
store first and second data respectively corresponding to the first and second VMs;
communicate the first and second data respectively to the first and second VMs, via the at least one mobile computing node, in response to communicating with the at least one mobile computing node.

3. The system of claim 1:
wherein the first VM includes at least one machine readable medium having instructions stored thereon for causing the first VM to discover at least one mobile computing node and communicate with the at least one mobile computing node;
wherein the at least one remote computing node comprises at least one storage medium having instructions stored thereon for causing the at least one remote computing node to communicate an actuation command to the first VM, via the at least one mobile computing node, to actuate the actuator to provide the vended good to the aperture.

4. The system of claim 1, wherein the at least one remote computing node comprises at least one storage medium having instructions stored thereon for causing the at least one remote computing node to:
establish a first communication session with at least one mobile computing node; and
communicate the first and second inventory data to the at least one mobile computing node in response to establishing the first communication session and before the first communication session ends.

5. The system of claim 1,
wherein the first VM includes at least one machine readable medium having instructions stored thereon for causing the first VM to establish a first communication session with at least one mobile computing node and later terminate the first communication session;
wherein the second VM includes at least one machine readable medium having instructions stored thereon for causing the second VM to establish a second communication session with the at least one mobile computing node and later terminate the second communication session;

wherein at least a portion of the first and second communication sessions overlap one another.

6. The system of claim 1, wherein the at least one remote computing node comprises at least one storage medium having instructions stored thereon for causing the at least one remote computing node to:
 establish a first communication session with at least one mobile computing node;
 communicate the first and second inventory data to the at least one mobile computing node in response to establishing the first communication session and before the first communication session ends; and
 in response to a user initiated selection of a product corresponding to the first inventory data, provide directions to the user, via the at least one mobile computing node, regarding a physical location of the first VM;
 wherein the user initiated selection is communicated from the at least one mobile computing node.

7. The system of claim 1, wherein the first inventory data corresponds to one or more products available via the first VM;
 wherein the first VM includes at least one machine readable medium having instructions stored thereon for causing the first VM to discover at least one mobile computing node and communicate with the at least one mobile computing node;
 wherein the at least one remote computing node comprises at least one storage medium having instructions stored thereon for causing the at least one remote computing node to: (a) receive a selection communication, corresponding to a user's selection of the one or more products, from the at least one mobile computing node, and (b) in response to receiving the selection communication, communicate an actuation command to the first VM, via the at least one mobile computing node, to actuate the actuator to deliver the vended good to the aperture.

8. A system comprising:
 a first vending machine (VM) comprising:
  a first exterior chassis having a top, bottom, backside, front side, and first and second sides that couple the front side to the backside;
  a first wireless short range communications node included in the first chassis;
  a first actuator coupled to a first compartment included in the first chassis; and
  at least one first machine readable medium having instructions stored thereon for causing the first VM to (a) discover at least one mobile computing node and communicate with the at least one mobile computing node, and (b) receive a first actuation command, via the at least one mobile computing node, from at least one remote computing node to actuate the first actuator to provide a first vended good to a first aperture in the first chassis;
  wherein each of the front side and first and second sides includes no physically manipulatable consumer interface with which the consumer can control the first VM via direct physical manipulation of the first VM;
 a second VM comprising:
  a second exterior chassis;
  a second wireless short range communications node included in the second chassis;
  a second actuator coupled to a second compartment included in the second chassis; and
  at least one second machine readable medium having instructions stored thereon for causing the second VM to (a) discover the at least one mobile computing node and communicate with the at least one mobile computing node, and (b) receive a second actuation command, via the at least one mobile computing node, from the at least one remote computing node to actuate the second actuator to provide a second vended good to a second aperture in the second chassis;
  wherein neither of the first and second VMs include memory storing inventory data related to either of the first and second vended goods.

9. The system of claim 8,
 wherein the at least one first medium comprises instructions to receive first data, sent from the at least one remote computing node to the first VM via the at least one mobile computing node, in response to the first VM communicating with the at least one mobile computing node;
 wherein the at least one second medium comprises instructions to receive second data, sent from the at least one remote computing node to the second VM via the at least one mobile computing node, in response to the second VM communicating with the at least one mobile computing node.

10. The system of claim 9, wherein the first data includes first advertising content and the second data includes second advertising content unequal to the first advertising content.

11. The system of claim 8,
 wherein the at least one first medium comprises instructions to cause the first VM to establish a first communication session with the at least one mobile computing node and later terminate the first communication session;
 wherein the at least one second medium comprises instructions to cause the second VM to establish a second communication session with the at least one mobile computing node and later terminate the second communication session;
 wherein at least a portion of the first and second communication sessions overlap one another.

12. At least one remote computing node system comprising:
 at least one storage medium and at least one processor coupled to the at least one storage medium;
 an inventory management module, included in the at least one storage medium, including first inventory data corresponding to a first vending machine (VM) and second inventory data corresponding to a second VM;
 wherein the first VM comprises an exterior chassis; a wireless short range communications node included in the chassis; and an actuator coupled to a compartment included in the chassis;
 wherein the at least one storage medium has instructions stored thereon for causing the at least one remote computing node system to communicate (a) a first actuation command to the first VM, via at least one mobile computing node, to actuate the actuator of the first VM to provide a first vended good to an aperture included in the first VM, and (a) a second actuation command to the second VM, via the at least one mobile computing node, to actuate an actuator included in the second VM to provide a second vended good to an aperture included in the second VM;

wherein neither of the first and second VMs include memory storing inventory data related to either of the first and second inventory data.

13. The system of claim 12, wherein the at least one storage medium has instructions to:
communicate with the at least one mobile computing node;
store first and second data respectively corresponding to the first and second VMs;
communicate the first and second data respectively to the first and second VMs, via the at least one mobile computing node, in response to communicating with the at least one mobile computing node.

14. The system of claim 12, wherein the at least one storage medium has instructions to:
establish a first communication session with the at least one mobile computing node; and
communicate the first and second inventory data to the at least one mobile computing node in response to establishing the first communication session and before the first communication session ends.

15. The system of claim 12, wherein the at least one storage medium has instructions to:
establish a first communication session with the at least one mobile computing node;
communicate the first and second inventory data to the at least one mobile computing node in response to establishing the first communication session and before the first communication session ends; and
in response to a user initiated selection of a product corresponding to the first inventory data, provide directions to the user, via the at least one mobile computing node, regarding a physical location of the first VM;
wherein the user initiated selection is communicated from the at least one mobile computing node.

16. The system of claim 12, wherein the at least one storage medium has instructions to:
receive a selection communication, corresponding to a user's selection of the one or more products, from the at least one mobile computing node; and
in response to receiving the selection communication, communicate the first actuation command to the first VM.

* * * * *